(12) United States Patent
Bacino

(10) Patent No.: US 8,808,848 B2
(45) Date of Patent: Aug. 19, 2014

(54) POROUS ARTICLE

(75) Inventor: John E. Bacino, Landenburg, PA (US)

(73) Assignee: W. L. Gore & Associates, Inc., Newark, DE (US)

(*) Notice: Subject to any disclaimer, the term of this patent is extended or adjusted under 35 U.S.C. 154(b) by 568 days.

(21) Appl. No.: 12/879,333

(22) Filed: Sep. 10, 2010

(65) Prior Publication Data

US 2012/0064273 A1 Mar. 15, 2012

(51) Int. Cl.
| | |
|---|---|
| B32B 3/26 | (2006.01) |
| B32B 5/22 | (2006.01) |
| B32B 27/32 | (2006.01) |
| B32B 3/10 | (2006.01) |
| B01D 69/12 | (2006.01) |
| B32B 1/08 | (2006.01) |
| B01D 67/00 | (2006.01) |
| B01D 71/32 | (2006.01) |
| B01D 71/36 | (2006.01) |

(52) U.S. Cl.
CPC ............. *B01D 69/12* (2013.01); *B32B 27/322* (2013.01); *B32B 3/10* (2013.01); *B32B 2305/026* (2013.01); *B32B 5/22* (2013.01); *B01D 2325/08* (2013.01); *B32B 3/26* (2013.01); *B01D 67/0004* (2013.01); *B01D 67/0088* (2013.01); *B01D 71/32* (2013.01); *B01D 71/36* (2013.01); *B32B 2597/00* (2013.01); *B32B 1/08* (2013.01)
USPC .................. 428/316.6; 428/315.5; 428/315.7; 428/315.9; 428/195.1; 428/213; 428/319.3; 428/319.7; 428/319.9

(58) Field of Classification Search
USPC .......... 428/316.6, 315.5, 315.7, 315.9, 195.1, 428/213, 319.3, 319.7, 319.9
See application file for complete search history.

(56) References Cited

U.S. PATENT DOCUMENTS

| | | | |
|---|---|---|---|
| 3,341,497 | A | 9/1967 | Sherman et al. |
| 3,354,022 | A | 11/1967 | Dettre et al. |
| 3,953,566 | A | 4/1976 | Gore |
| 3,962,153 | A | 6/1976 | Gore |
| 4,096,227 | A | 6/1978 | Gore |
| 4,187,390 | A | 2/1980 | Gore |
| 4,230,463 | A | 10/1980 | Henis et al. |
| 4,746,333 | A | 5/1988 | Peinemann et al. |
| 4,754,009 | A | 6/1988 | Squire |
| 4,857,080 | A | 8/1989 | Baker et al. |
| 4,863,974 | A * | 9/1989 | Mallouk et al. ................ 521/85 |

(Continued)

FOREIGN PATENT DOCUMENTS

| | | |
|---|---|---|
| EP | 0 307 123 | 3/1989 |
| EP | 0 513 392 | 11/1992 |

(Continued)

OTHER PUBLICATIONS

International Search Report PCT/US2011/050636, Dec. 5, 2011, 3 pages.

*Primary Examiner* — Hai Vo
(74) *Attorney, Agent, or Firm* — Amy L. Miller

(57) ABSTRACT

Porous articles having an expanded fluoropolymer and a coherent irregular network are described. In one embodiment, the coherent irregular network is attached to the expanded fluoropolymer at only a portion of the adjacent region. In another aspect of the invention the coherent irregular network is a free standing film. The coherent irregular network in one embodiment has a surface roughness defined by an Sp value of greater than 35 um.

73 Claims, 14 Drawing Sheets

(56) References Cited

U.S. PATENT DOCUMENTS

| | | |
|---|---|---|
| 4,945,125 A | 7/1990 | Dillon et al. |
| 5,024,882 A | 6/1991 | Matucha et al. |
| 5,032,450 A | 7/1991 | Rechlicz et al. |
| 5,066,683 A | 11/1991 | Dillon et al. |
| 5,116,650 A | 5/1992 | Bowser |
| 5,143,783 A | 9/1992 | Shimizu et al. |
| 5,156,780 A | 10/1992 | Kenigsberg et al. |
| 5,157,058 A | 10/1992 | Dillon et al. |
| 5,271,839 A | 12/1993 | Moya et al. |
| 5,343,434 A | 8/1994 | Noguchi |
| 5,352,513 A | 10/1994 | Mrozinski et al. |
| 5,362,553 A | 11/1994 | Dillon et al. |
| 5,370,836 A | 12/1994 | Yokoyama et al. |
| 5,462,586 A | 10/1995 | Sugiyama et al. |
| 5,466,509 A | 11/1995 | Kowligi et al. |
| 5,539,072 A | 7/1996 | Wu |
| 5,554,414 A | 9/1996 | Moya et al. |
| 5,555,238 A | 9/1996 | Miyazawa |
| 5,560,986 A | 10/1996 | Mortimer, Jr. |
| 5,627,042 A | 5/1997 | Hirose et al. |
| 5,677,031 A | 10/1997 | Allan et al. |
| 5,772,736 A | 6/1998 | van Schravendijk et al. |
| 5,776,343 A | 7/1998 | Cullen et al. |
| 5,919,878 A | 7/1999 | Brothers et al. |
| 5,948,707 A | 9/1999 | Crawley et al. |
| 5,968,642 A | 10/1999 | Saito |
| 6,019,920 A | 2/2000 | Clough |
| 6,143,675 A | 11/2000 | McCollam et al. |
| 6,159,565 A | 12/2000 | Campbell et al. |
| 6,196,708 B1 | 3/2001 | Rogers |
| 6,355,081 B1 | 3/2002 | Wang et al. |
| 6,410,084 B1 | 6/2002 | Klare et al. |
| 6,461,679 B1 | 10/2002 | McMeekin et al. |
| 6,518,349 B1 * | 2/2003 | Felix et al. ............ 524/492 |
| 6,579,342 B2 | 6/2003 | Wang et al. |
| 6,627,291 B1 | 9/2003 | Clark et al. |
| 6,638,610 B1 | 10/2003 | Yao |
| 6,673,416 B1 | 1/2004 | Nishio |
| 6,676,993 B2 | 1/2004 | Klare |
| 6,683,126 B2 | 1/2004 | Keller et al. |
| 6,723,147 B2 | 4/2004 | Mashiko et al. |
| 6,737,489 B2 | 5/2004 | Linert et al. |
| 6,780,497 B1 | 8/2004 | Walter |
| 6,840,982 B2 | 1/2005 | Kunstadt et al. |
| 6,946,187 B2 | 9/2005 | Hurten et al. |
| 7,147,378 B2 | 12/2006 | Chu et al. |
| 7,279,025 B2 | 10/2007 | Apte et al. |
| 7,399,522 B2 | 7/2008 | Nakanishi et al. |
| 2001/0018096 A1 | 8/2001 | Klare |
| 2002/0111667 A1 | 8/2002 | Girton et al. |
| 2003/0204011 A1 | 10/2003 | Bladel et al. |
| 2004/0002554 A1 | 1/2004 | Klare |
| 2004/0025693 A1 | 2/2004 | Bedingfield et al. |
| 2004/0028890 A1 | 2/2004 | Yao |
| 2004/0168417 A1 | 9/2004 | Tanaka et al. |
| 2004/0191525 A1 | 9/2004 | Roberts |
| 2005/0003203 A1 | 1/2005 | Brown |
| 2005/0061663 A1 | 3/2005 | Chen et al. |
| 2005/0087070 A1 | 4/2005 | Odaka et al. |
| 2005/0124242 A1 | 6/2005 | Norvell et al. |
| 2006/0047311 A1 | 3/2006 | Lutz et al. |
| 2006/0269735 A1 | 11/2006 | Wang et al. |
| 2007/0231542 A1 | 10/2007 | Deng et al. |
| 2008/0122141 A1 | 5/2008 | Bedal et al. |
| 2008/0257155 A1 | 10/2008 | Bacino et al. |
| 2010/0065490 A1 | 3/2010 | Balster et al. |
| 2010/0278891 A1 * | 11/2010 | Ringeisen et al. ............ 424/422 |

FOREIGN PATENT DOCUMENTS

| | | |
|---|---|---|
| EP | 0 729 901 | 9/1996 |
| EP | 1 216 089 | 6/2002 |
| EP | 1 982 757 | 4/2007 |
| GB | 2 327 372 | 1/1999 |
| GB | 2 337 991 | 12/1999 |
| JP | 60-172306 | 2/1984 |
| WO | 94/13469 | 6/1994 |
| WO | 96/32635 | 10/1996 |
| WO | 2004/091747 | 6/2005 |
| WO | 2006/127946 | 11/2006 |

* cited by examiner

POROUS ARTICLE

FIELD OF THE INVENTION

Porous articles comprising a porous fluoropolymer and a coherent irregular network of a thermoplastic, wherein the network is attached to the porous fluoropolymer are described herein. A free-standing porous coherent irregular network article is also described.

BACKGROUND OF THE INVENTION

Expanded fluoropolymers such as expanded PTFE (ePTFE) are used in a wide variety of applications, including but not limited to filtration, venting, garments, medical implants, electronic wire and cable and the like. Expanded PTFE is porous; allowing fluid to pass there through. In some applications, the expanded fluoropolymer is attached to one or more support layers that provide dimensional stability and mechanical reinforcement. In addition, some applications expose the expanded fluoropolymer to high temperature or aggressive chemicals, limiting the type of support materials that can be used. In these challenging applications, it is sometimes necessary to use a fluoropolymer support, and in particular, one that is stable at high temperature. Fluoropolymer support materials such as non-wovens, netting, fabrics, felts, or other porous fluoropolymer materials are very expensive, have limited availability and are difficult to attach to other fluoropolymer materials such as the expanded fluoropolymer.

Further, in many applications, such as for example venting, both breathability and structural integrity are necessary for peak performance of articles. In this regard, many prior art composites utilize durable materials, but compromise breathability to achieve durability. Additionally, there are many prior art composites which have a high degree of breathability, but are lacking in the necessary durability for its applications.

Thus, there remains a need in the art for porous composites that are inexpensive, widely available, easy to use and attach and has outstanding characteristics of both structural integrity and breathability.

SUMMARY OF THE INVENTION

Porous articles having an expanded fluoropolymer layer and a coherent irregular network of thermoplastic particles attached thereto are described herein. In one aspect of the invention the porous article has the coherent irregular network on both a first and second surface, and in other embodiments the coherent irregular network is only on a first surface. The porous article is permeable and in some embodiments the specific resistance is less than 2400 krayls and greater than 0.24 krayls. The porous article of the present invention is provided in some embodiments as being dimensional stability and having a percent area shrinkage of less than 20% as measure and defined herein. In addition, the porous article in some embodiments is provided with a coherent irregular network having a pattern, such as an embossed, linear, discrete, connected and the like as described herein.

Another aspect of the invention provides an expanded fluoropolymer in a tube, rod, sheet or membrane form. In one embodiment the expanded fluoropolymer is expanded PTFE.

In one aspect of the invention, the coherent irregular network is provided with open areas, and in some embodiments these open areas are greater than 50 microns in size. In addition, a coherent irregular network having bridging is provided in some embodiments. The coherent irregular network is further provided having a thickness greater than 5 micron, or is some embodiments greater than 5 microns but less than 500 microns. In one aspect of the invention, the coherent irregular network is provided and defined by an Sp value of greater than 35 microns on at least one surface of the porous article. In some embodiments the coherent irregular network is provide having a BET surface area of at least 0.35 m^2/g, and in other embodiments between 0.25 m^2/g and 5 m^2/g.

In some embodiments the coherent irregular network comprises a thermoplastic fluoropolymer, and some of these thermoplastic fluoropolymers are provided having a melt flow index (MFI) of between 0.3 g/10 min. and 10 g/10 min. The thermoplastic fluoropolymer used to make the coherent irregular network is in some embodiments, fluorinated ethylene propylene (FEP) and more specifically, in some embodiments, this FEP is provided having an MFI of less than 1.0 g/10 min.

The coherent irregular network in some embodiments is provided as comprising one or more types of polymer, and in some of these embodiments, the polymers have different size, shape, or melting characteristic, such as melting temperature or MFI.

A free standing film of coherent irregular network is provided having features as described above in various embodiments. Both the free standing film and porous article of the present invention are provided having an oleophobic or hydrophilic treatment is some embodiments. In addition, a support layer affixed to either surface of the porous article or free standing film of the present invention is provided.

BRIEF DESCRIPTION OF THE FIGURES

The foregoing and still other objects of this invention will become fully apparent, along with various advantages and features of novelty residing in the present embodiments, from study of the following drawings and description of these embodiments. Wherein indicia of reference are shown to match related matter stated in the text, as well as the claims section annexed hereto; and accordingly, a better understanding of the invention and the variant uses is intended, by reference to the figures, which are considered as primarily exemplary and not to be therefore construed as restrictive in nature; wherein:

DETAILED DESCRIPTION OF THE INVENTION

Figure 1:
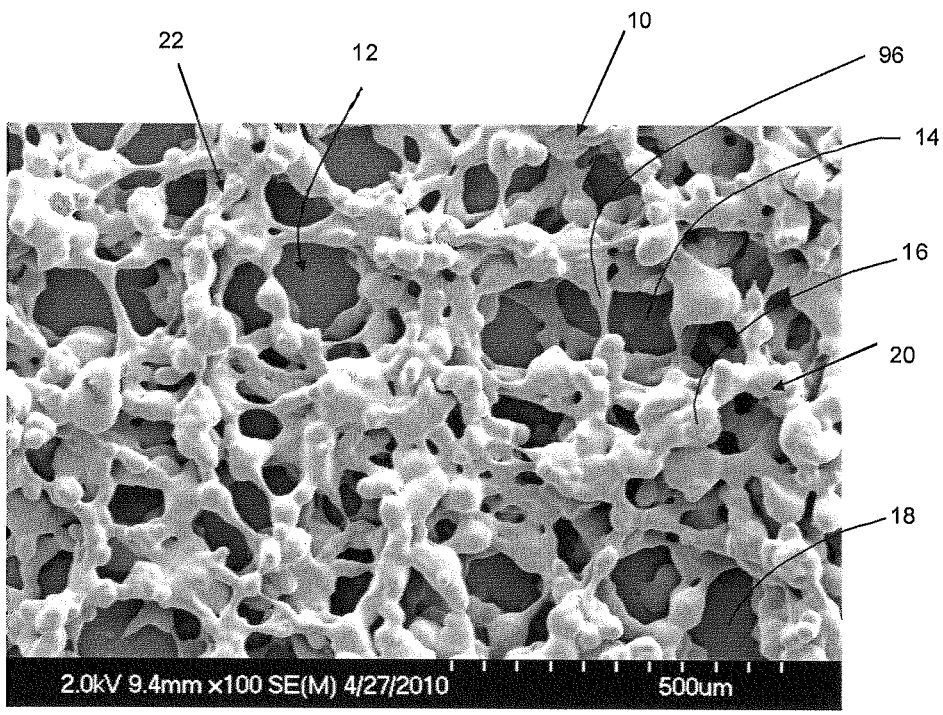
FIG. 1 is a SEM photomicrograph of the surface of an exemplary embodiment of the porous article.

Described herein are porous articles comprising a porous fluoropolymer and a coherent irregular network of a thermoplastic. The coherent irregular network comprises particles or elements of thermoplastic that are attached together and in one embodiment are attached or adhered to the porous fluoropolymer in such a way that the fluoropolymer substantially retains its porous structure. For example, in some embodiments the values for bubble point, Frazier number, and Gurley are substantially the same for the fluoropolymer before and after attaching the coherent irregular network to the surface of the porous fluoropolymer.

The invention will be described with reference to the following description and figures which illustrate certain embodiments. It will be apparent to those skilled in the art that these embodiments do not represent the full scope of the invention which is broadly applicable in the form of variations and equivalents as may be embraced by the claims appended hereto. Furthermore, features described or illustrated as part of one embodiment may be used with another embodiment to yield still a further embodiment. It is intended that the scope of the claims extend to all such variations and embodiments.

It should be noted that any given range presented herein is intended to include any and all lesser included ranges. For example, a range of from 45-90 would also include 50-90; 45-80; 46-89 and the like. Thus, for example, the range of 95% to 99.999% also includes, for example, the ranges of 96% to 99.1%, 96.3% to 99.7%, and 99.91 to 99.999%.

In one aspect of the invention, the coherent irregular network is attached to an expanded fluoropolymer layer and has a surface roughness defined by a Sp value greater than 35 um. As shown in the surface scanning electron micrograph (SEM) in FIG. 1, the coherent irregular network 20 of the porous article 10, comprises attached thermoplastic elements 16 that have been fused together creating a network having connecting portions 96, porosity 18, and open areas 14.

Figure 2:
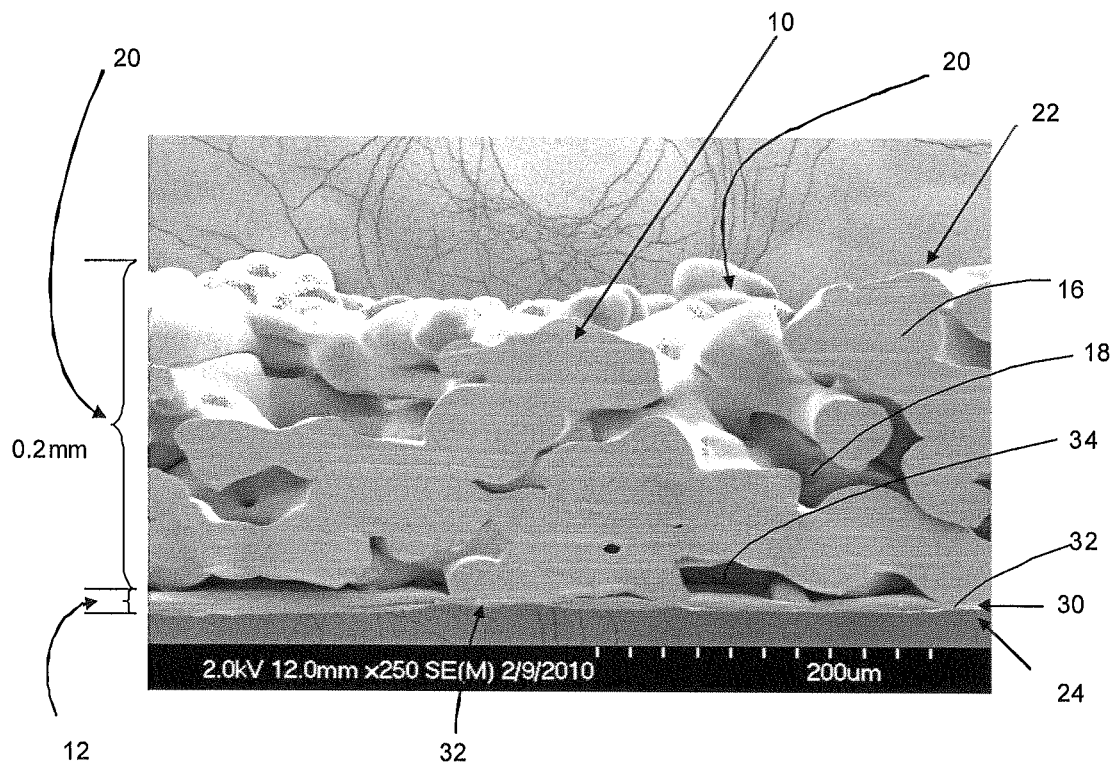
FIG. 2 is a SEM photomicrograph of a cross-section of an exemplary embodiment of the porous article.
Figure 3:
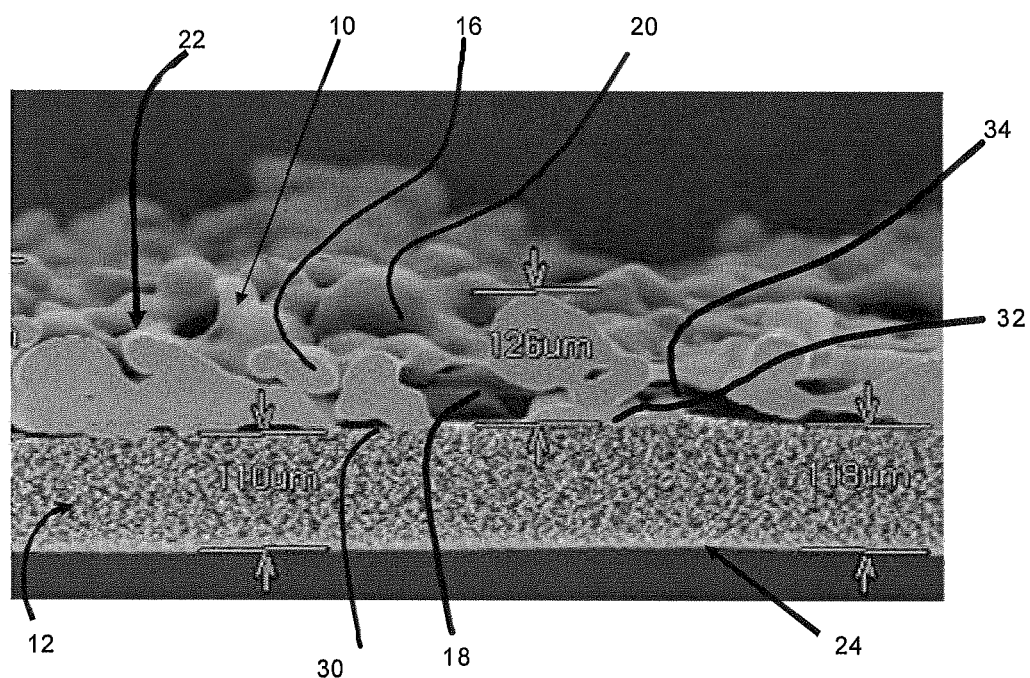
FIG. 3 is a SEM photomicrograph of a cross-section of an exemplary embodiment of the porous article.

A cross sectional SEM of one embodiment of the porous article 10 is shown in FIG. 2, wherein the coherent irregular network 20 is attached, as shown by the attached areas 32, to the expanded fluoropolymer 12 at only a portion of the adjacent region 30. In addition, FIG. 2 further depicts bridging 34 of the coherent irregular network 20 along the adjacent region 30 between the coherent irregular network 20 and the expanded fluoropolymer layer 12. The thickness of the coherent irregular network 20 in FIG. 2 is approximately 200 um and the thickness of the expanded fluoropolymer 12 is approximately 10 um. The porous article 10 depicted in FIG. 2 has a coherent irregular network 20 as a first surface 22 and the expanded fluoropolymer layer 12 as a second surface 24. A cross sectional SEM of another embodiment is provided in FIG. 3, wherein the thickness of the coherent irregular network 20 is approximately 126 um and the thickness of the expanded fluoropolymer layer 12 is approximately 114 um. In addition, the difference in the thickness of expanded fluoropolymer and the coherent irregular network in FIG. 3 is much less than difference in the thickness of expanded fluoropolymer and the coherent irregular network depicted in FIG. 2. Both FIG. 2 and FIG. 3 show the porosity 18 in the coherent irregular network 20 and attached areas 32 where the coherent irregular network is attached to the expanded fluoropolymer layer 12 at only a portion of the adjacent region 30. The thickness ratio of the coherent irregular network to the expanded fluoropolymer can be made to be 20 or higher as depicted in FIG. 2, or much lower, such as approximately 1 as depicted in FIG. 3. The thickness ratio of the coherent irregular network to the expanded fluoropolymer can be made over a large range, such as from 5 to 40, or 5 to 80, on the high end where there is a relatively large amount of the coherent irregular network, and much lower, such as 0.25 to 5, or any ratio between 0.25 and 80.

In some embodiments it may be desirable for the coherent irregular network to have very little attachment to the expanded fluoropolymer. As shown in FIG. 2, and FIG. 3 and FIG. 4b, the coherent irregular network has an attached area 32 along the adjacent region 30. Not wanting to be limited by any theory, it is believed that minimizing the attachment of the coherent irregular network to the expanded fluoropolymer results in higher permeability. An attached area ratio can be determined by analysis of a cross section SEM; wherein the length of the attached area depicted in the SEM is measured and divided by the overall length of the adjacent region shown in the same SEM image. The attached area ratio can be made to be very low, such as less than 0.1 or higher such as 0.8, or more, desirably between about 0.05 to 0.25.

It was surprisingly found that bridging of the coherent irregular network exists even for relatively thick coherent irregular networks. Bridging as defined and used herein is used to describe the gap or porosity between the surface of the expanded fluoropolymer and the surface of a connecting section of coherent irregular network between two attached regions. Bridging 34 is shown in the cross sectional SEM in FIGS. 2, and 3 where the SEM clearly show gaps between the coherent irregular network elements and the underlying expanded fluoropolymer.

Figure 8A:
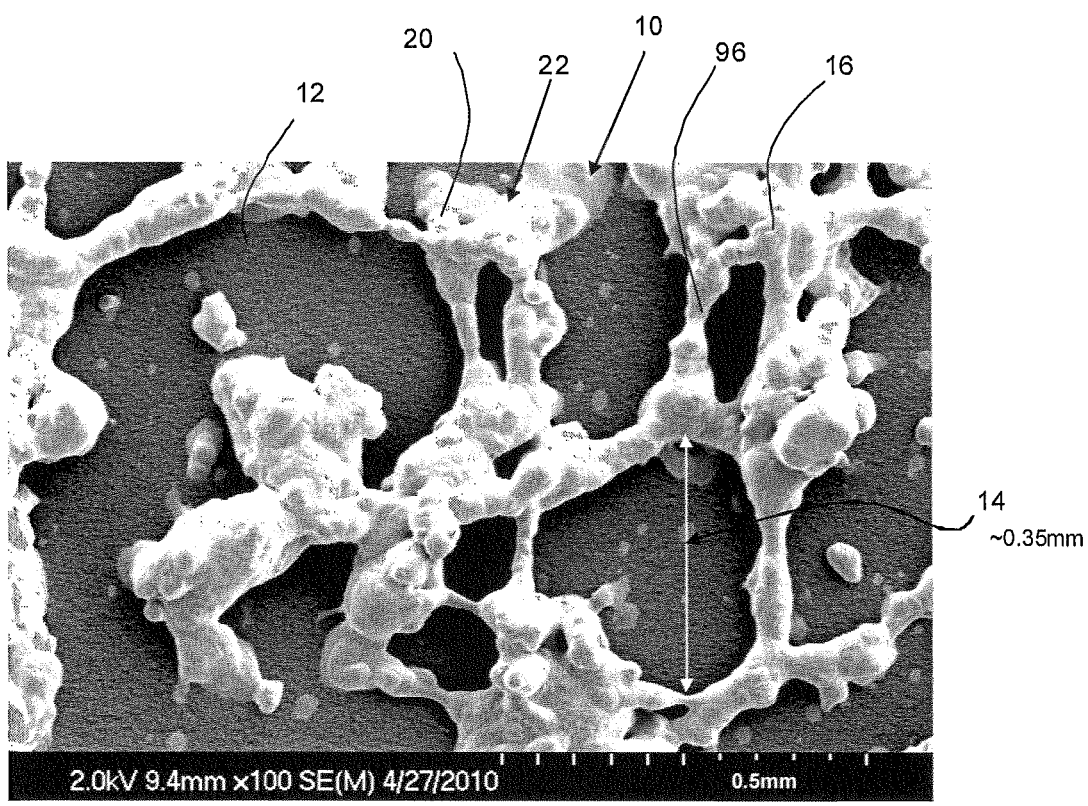
FIG. 8A is a SEM photomicrograph of the surface of an exemplary embodiment of the porous article.
Figure 19A:
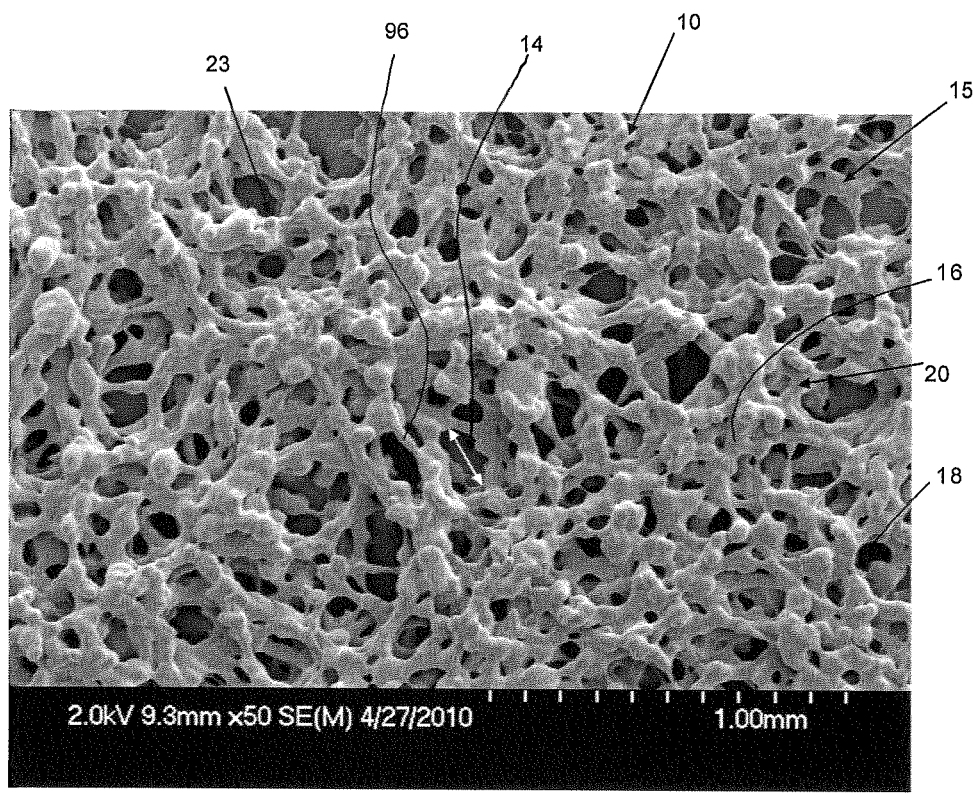
FIG. 19A is a SEM photomicrograph of a first surface of a free standing coherent irregular network.

Open areas as used herein are defined as areas of porosity in the coherent irregular network that extend completely through the thickness of the material. As shown in FIG. 1, the coherent irregular network 20 does not completely occlude the surface of the expanded fluoropolymer 12 underneath, and the areas where the expanded fluoropolymer can be identified through the coherent irregular network are open areas 14. The "size" of an open area as used herein is defined as being the distance of the longest straight line that can be drawn across the open area opening as shown in FIG. 8A and FIG. 19A. For example FIG. 8A is a surface SEM of a porous article comprising a coherent irregular network having an open area 14 approximately 350 microns in size as shown, and FIG. 19A is a surface SEM of a free standing film of coherent irregular network having an open area 14 approximately 200 microns in size as shown.

Figure 4A:
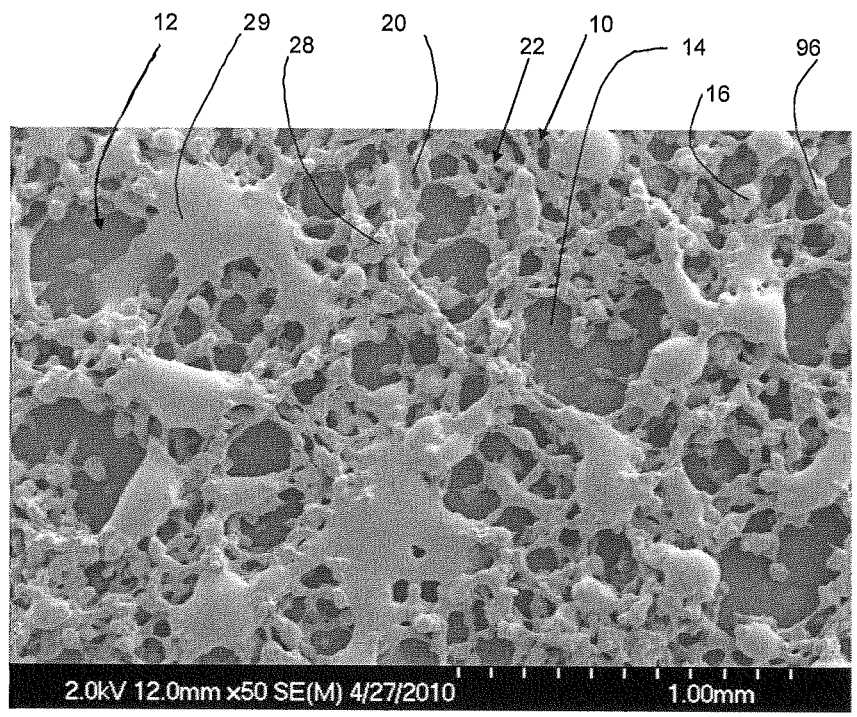
FIG. 4A is a SEM photomicrograph of the surface of an exemplary embodiment of the porous article.
Figure 4B:
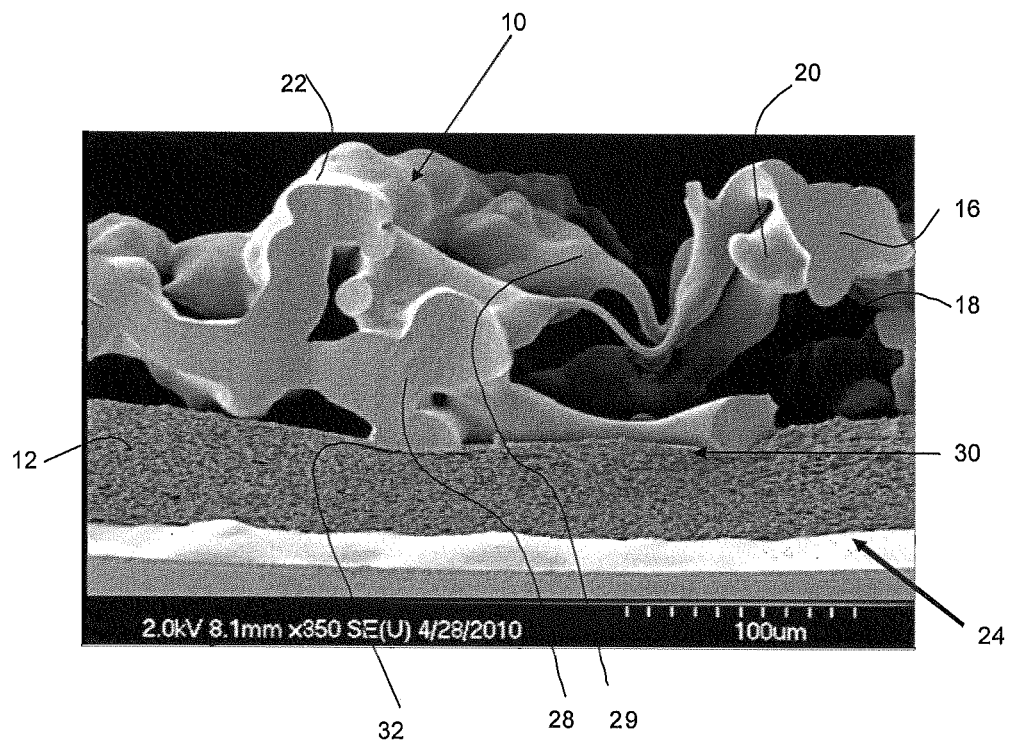
FIG. 4B is a SEM photomicrograph of a cross-section of an exemplary embodiment of the porous article.

Connecting portion of the coherent irregular network as used herein is defined as a segment of the coherent irregular network that is attached at either end to a particle, element, or other connecting portion of the coherent irregular network, as shown in FIG. 1, FIGS. 4A and 19A.

The expanded fluoropolymer can be made out of any fluoropolymer that can be expanded to make a porous and permeable article; suitable materials include expandable fluoropolymers such as but not limited to expanded PTFE, and expanded products made with polymers as described in U.S. Pat. No. 5,708,044 (Branca, 1998), U.S. Pat. No. 6,541,589 (Baillie, 2003), U.S. Pat. No. 7,531,611 (Sabol et al., 2009), U.S. patent application Ser. No. 11/906,877 (Ford), and the like.

The expanded fluoropolymer can be made to have a properties specific for the application the porous article is intended for. The expanded fluoropolymer may be made to have a bubble point greater than 5 psi, greater than 25 psi greater than 50 psi, greater than 75 psi, greater than 100 psi, or between 5 psi and 150 psi. The expanded fluoropolymer layer can be made very thin, such as approximately 1 um thick, or thick such as greater than 10 mm thick. The expanded fluoropolymer layer can be made to have a wide range of permeability, or specific flow resistance as defined herein. Permeability of articles are measured using a Gurley Densometer and/or a Frazier test as described herein; for simplicity these values will be converted into a specific flow resistance or krayls, which is directly proportional to Gurley seconds and inversely proportional to the Frazier number as defined below:

krayls=Gurley seconds×7.834 krayls=24.4921/Frazier Number

The value of krayls is in kilo pascals*second per meter or (kPa s/m).

The expanded fluoropolymer can be made to have a specific flow resistance between about 2400 krayls to 0.61 krayls, or between about 2400 krayls and 0.12 krayls. The greater the specific resistance, or krayl value the less permeable the porous article is.

The properties of four different ePTFE membranes, all provided by W. L. Gore and Associates Inc., are described in Table 1. The membranes described in Table 1 have a range of properties and characteristics that demonstrates the wide diversity of expanded fluoropolymer that can be used in making the porous article of the present invention.

TABLE 1

| Expanded Fluoropolymer | | | | |
|---|---|---|---|---|
| Expanded Fluropolymer | krayls | Thickness um | Area Mass g/m 2 | Bubble Point kPa |
| A | 88 | 55 | 22 | 165 |
| B | 0.45 | 30 | | <10 |
| C | 103 | 5 | 3.6 | 710 |
| D | 0.24 | | | <10 |

Figure 20:
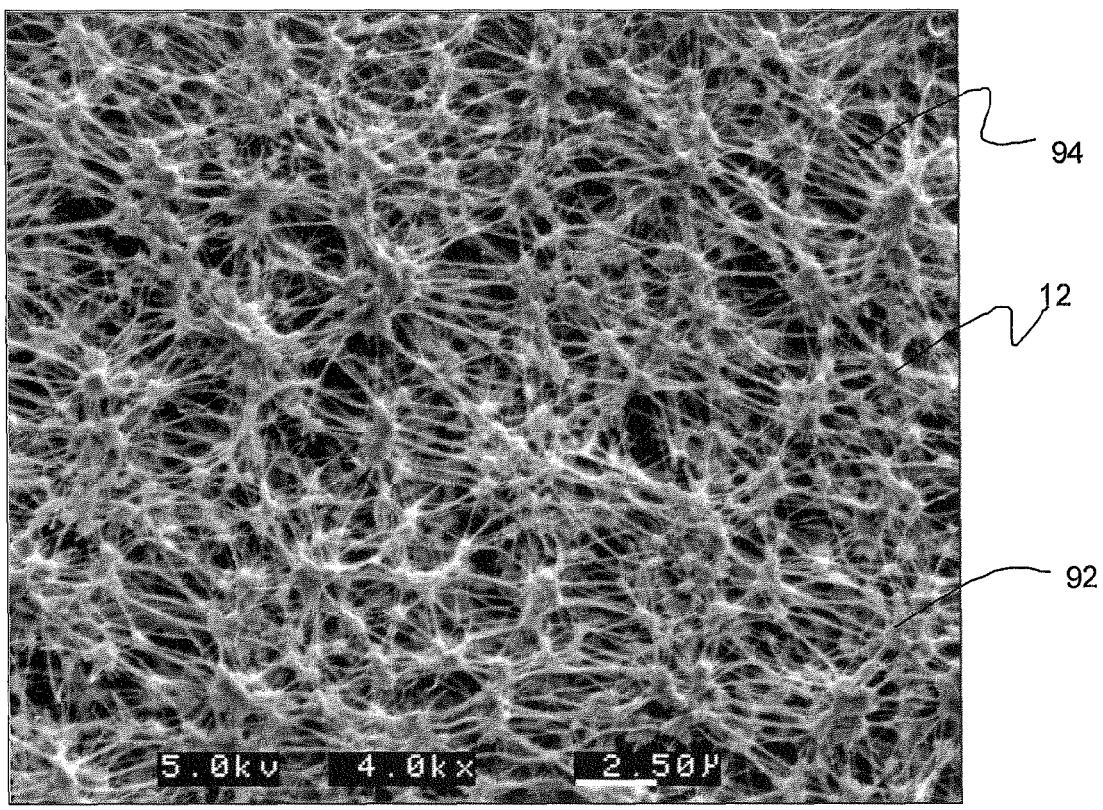
FIG. 20 is a SEM photomicrograph of membrane A.

Membrane A was made according the teachings of U.S. Pat. No. 3,953,566 to Gore and is further described as having nodes 92 interconnected to fibrils 94 as shown in FIG. 20. Membrane B was made generally following the teachings of U.S. Pat. No. 5,814,405 to Branca et. al. Membrane C was made generally following the teachings of U.S. Pat. No. 7,306,729 to Bacino, et. al. Membrane D was made generally following the teachings of U.S. Pat. No. 4,902,423 to Bacino.

The coherent irregular network that may be attached to an expanded fluoropolymer or made into a free standing article as defined herein is a coherent irregular network of thermoplastic particles attached together. The term coherent as used in defining the coherent irregular network means that the article comprises elements effectively connected together such that the article can be free standing, and therefore does not include discrete particles that may be attached to a substrate, such as fluoroplastic adhesive coated onto a expanded fluoropolymer substrate. The term irregular as used in defining the coherent irregular network means that the structure of the coherent irregular network comprises connecting portions that do not have a consistent diameter or cross-section area across along the length of the connecting portions between intersections or attachments with other connecting portions, particles or elements, and therefore does not included spun-bonded, woven, or felted products that consists of fibers having a consistent cross sectional area. The term network as used in defining the coherent irregular network means that individual elements of the coherent irregular network are effectively attached together to provide a contiguous structure. The coherent irregular network is further defined as comprising porosity between the attached elements throughout the thickness such that the coherent irregular network is porous and permeable. The coherent irregular network is still further defined as having open areas.

A wide range of thermoplastic particles could be used to create the coherent irregular network, including particles having a high molecular weight, or low melt flow index (MFI). Particles with MFI values between 0.2 and 30 g/10 min when tested according to the MFI method described herein may be more desirable. However particles with MFI values greater than 0.1 or less than 50 g/10 min may also be used. In addition, fluoroplastic particles including but not limited to FEP, EFEP, PFA, THV, PVDF, CTFE, and the like, and mixtures thereof are desired in some applications. The MFI values for some of the particles used to make the coherent irregular network are provided in Table 2. The data reported in Table 2 was collected following the MFI test methods provided herein unless otherwise noted.

TABLE 2

| Melt Flow Index (MFI) | | | | | |
|---|---|---|---|---|---|
| Powder | Type | MFI g/10 min | Temp. C. | Load kg | # of Samples Tested | Standard Deviation |
| A | FEP | 0.558 | 372 | 2.16 | N = 5 | 0.218 |
| B | EFEP | 20~30* | 265 | 5 | | |
| C | PFA | 5.97 | 372 | 2.16 | N = 5 | 0.269 |

*This value was reported by the supplier of powder B.

Powder A, or FEP-NC1500 and Powder C, or the EFEP powder were both provided by Daikin Industries, Ltd. (Orangeburg, N.Y.). Powder B, or PFA 9724 was supplied by E. I. du Pont de Nemours and Company, (Wilmington, Del.).

Figure 5:
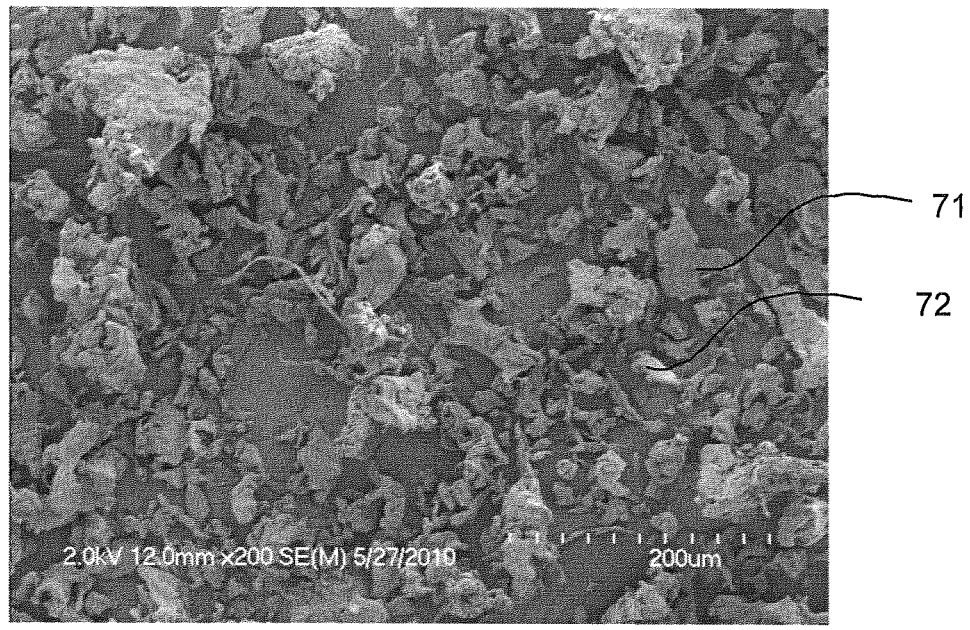
FIG. 5 is a SEM photomicrograph of a powder A, a fluoropolymer particle.
Figure 6:
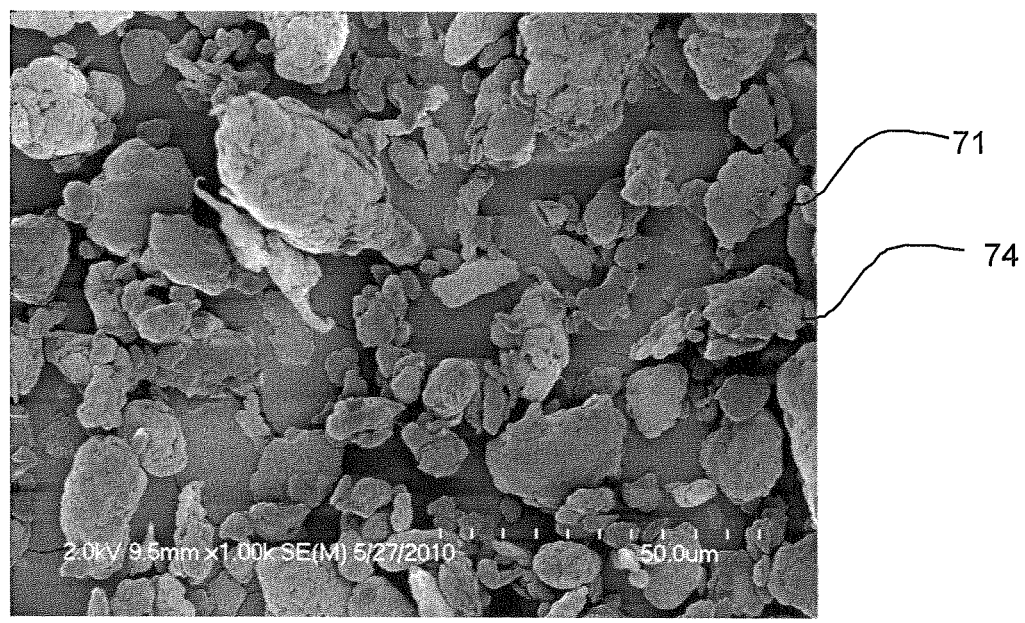
FIG. 6 is a SEM photomicrograph of powder B, a fluoropolymer particle.
Figure 7A:
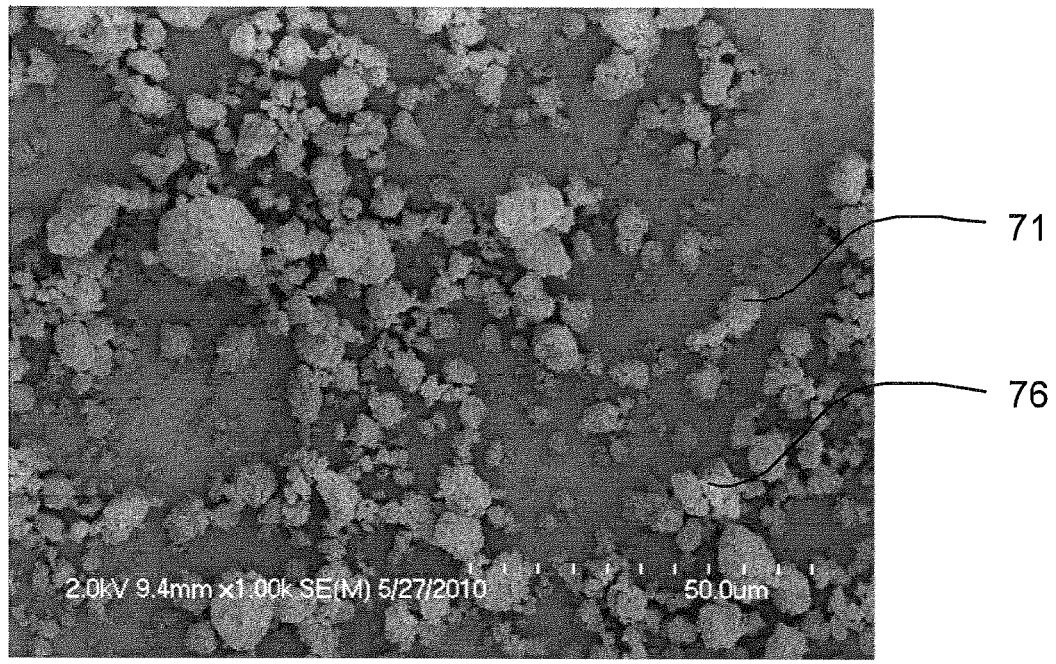
FIG. 7A is a SEM photomicrograph of powder C, a fluoropolymer particle.
Figure 7B:
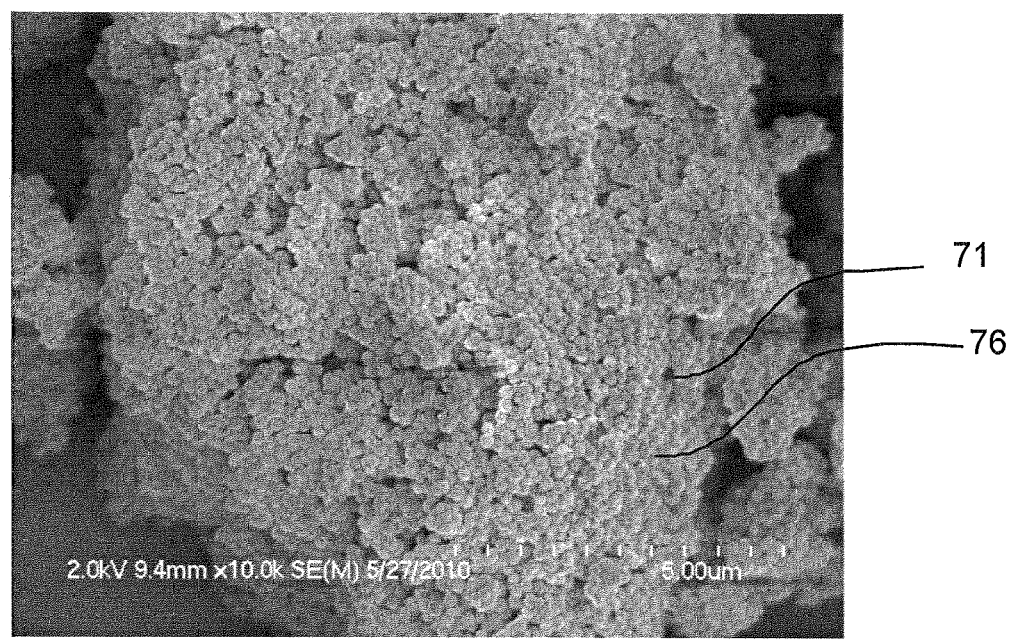
FIG. 7B is a SEM photomicrograph of powder C, a fluoropolymer particle.

The size of the particles may be selected to provide a specific network having a desired porosity, permeability, surface area or surface roughness. Some of the particles used to create the coherent irregular network were analyzed for particles size as described herein, and the data is reported in Table 3. Note that the average particle size (MA) is between 20 um and approximately 30 um. It is envisioned that smaller and larger particles or mixtures of two or more different size particles could be used to create the coherent irregular network. For example particles as small as 5 to 20 um may be employed, or particles up to 100 um may be used or any size there between. SEM images of some embodiments of particles 71 are provided in FIG. 5 through FIG. 7, where FIG. 5 is powder A 72, FIG. 6 is powder C 74 and FIGS. 7a and 7b are powder B 76 as defined in Table 2. The surface area of the three powders shown in FIG. 5 through FIG. 7 was measured as described herein, and powder B or the PFA particles had a very high surface area, greater than 13 m^2/g, as reported in Table 4. High surface area particles may be used in some applications to achieve better liquid roll-off properties.

TABLE 3

Particle Size

| | MV (um) | MN (um) | MA (um) |
|---|---|---|---|
| Powder A | 54.84 | 8.55 | 30.1 |
| Powder B | 29.27 | 11.6 | 22.06 |
| Powder C | 27.63 | 12.6 | 21.65 |

TABLE 4

BET Surface Area

| | BET m^2/g |
|---|---|
| Powder A | 0.365 |
| Powder B | 13.495 |
| Powder C | 1.584 |

In some embodiments, two or more different types of particles may be selected and used to make the coherent irregular network. In one embodiment, different types of particles are mixed together as shown if FIGS. 8A and 8B, and in another embodiment, one type of particle is applied to the expanded fluoropolymer layer before a second type of particle is applied, as shown in FIGS. 4A and 4B. Using two or more different types of particles can aid in attaching the coherent irregular network to the expanded fluoropolymer layer, attaching the permeable layer to a support layer, or provide a desired permeability, porosity, surface area, abrasion resistance, surface roughness, free standing film strength, or electrical conductivity or the like.

In one embodiment as shown in FIGS. 4A and 4B, a first particle was applied or coated onto the expanded fluoropolymer surface before a second type of particle was coated, and because the particles had different melting temperatures, the coherent irregular network comprises a distinct first element 28 and second element 29 within the coherent irregular network 20. In another embodiment wherein a first and second particle are applied to the expanded fluoropolymer sequentially, a first particle is chosen to have good adhesion to the expanded fluoropolymer, and a second particle is chosen for high abrasion resistance. In some cases it may be desirable to apply a number of different particles sequentially, such as 3 or more to form the coherent irregular network.

Figure 8B:
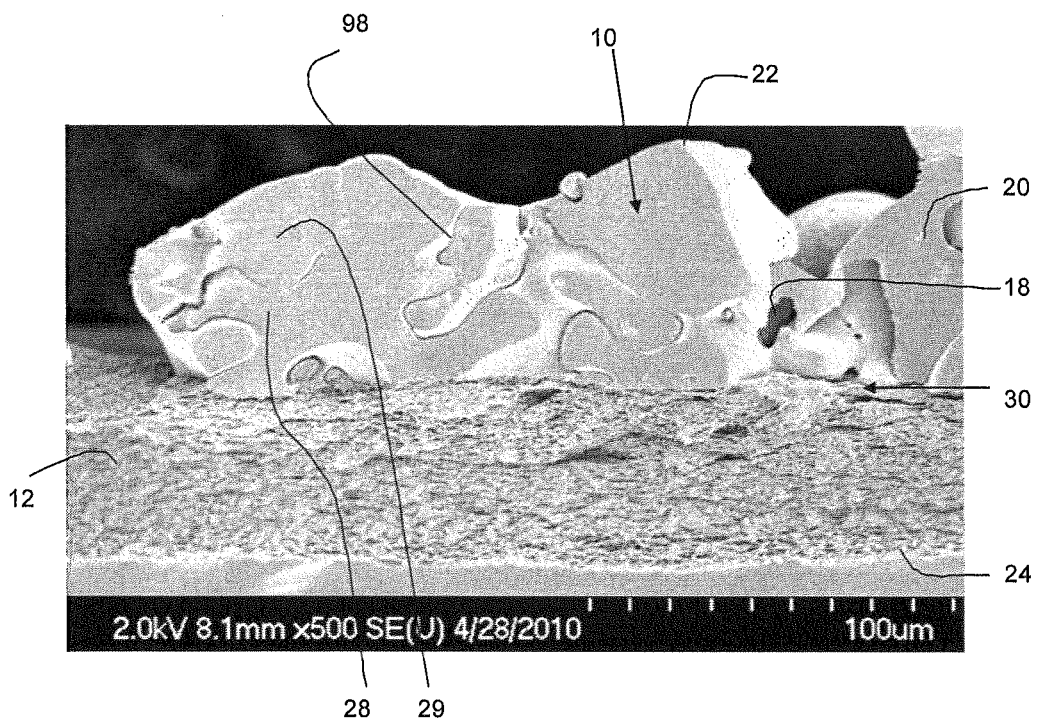
FIG. 8B is a SEM photomicrograph of a cross-section of an exemplary embodiment of the porous article.

In one embodiment, two or more types of particles are mixed or blended together before forming the coherent irregular network or before being applied or coated onto the expanded fluoropolymer. Furthermore, one particle type may be selected to have a lower melting temperature than the other particle types, such that the lower melting particle type melts to form the coherent irregular network, attaching the two or more different particles types. As shown in FIG. 8B, an interface 98 between a first element 28 and a second element 29 can be distinguished within the coherent irregular network 20.

Figure 9:
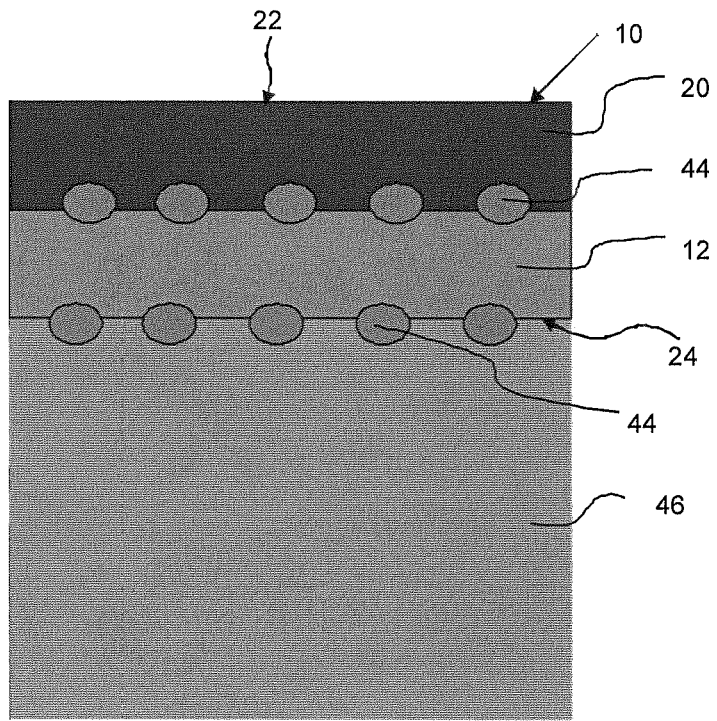
FIG. 9 is a cross sectional depiction of an exemplary embodiment of the porous article having a support material.

The coherent irregular network can be produced on the surface of the expanded fluoropolymer or it can be made into a free standing article. In one embodiment, the coherent irregular network is formed into a free-standing article, and then attached to the expanded fluoropolymer wherein the attachments are discontinuous such that the porous article remains permeable. The free standing coherent irregular network may be attached to the expanded fluoropolymer by heating to cause a portion of the coherent irregular network to melt and attach to the expanded fluoropolymer, or through the use of a discontinuous attachments, such as adhesive, or point bonding or the like. As depicted in FIG. 9, discontinuous attachments 44, secure the coherent irregular network 20, and a support material 46, to the expanded fluoropolymer 12.

In one embodiment, the coherent irregular network further comprises non-melt processible particles. The non-melt processible particles may be inorganic particle, such as silica, carbon, and the like, or a non-melt processible polymer such as polyimide, PPS, PTFE, or the like. In these embodiments, the thermoplastic particles or elements are attached to create a coherent irregular network, and the non-melt processible particles are attached therein or thereon.

In one embodiment, the non-melt processible particle may be applied before the coherent irregular network is fused. For example, in one embodiment a first thermoplastic type particle or mixture of two or more thermoplastic type particles is applied to the expanded fluoropolymer before a second non-melt processible type particle is applied. The coherent irregular network is then fused by, for example, heating to a sufficient temperature and time to cause the thermoplastic particles to form a coherent irregular network. In another embodiment a mixture of non-melt processible particles and thermoplastic particles is applied to the expanded fluoropolymer or to a coherent irregular network and heated for a sufficient temperature and time to create a coherent irregular network having non-melt processible particles incorporated therein or thereon.

The coherent irregular network can be made to have a high surface area which is a valuable feature in some applications. The surface area of the coherent irregular network made in accordance with Example 7 and Example 10, is reported in Table 5 and can be compared with the surface area of a 50 um thick FEP film, or Comparative Example 1. The surface area of Example 7 and Example 8 was 0.086 m^2/g, and 3.262 m^2/g respectively, both of which are far greater than the 0.024 m^2/g surface area of the FEP film. The FEP film has a flat, smooth surface which is not desirable for many applications. In some embodiments, the coherent irregular network can be made to have a surface area greater than 0.050 m^2/g, greater than 4.0 m^2/g, or between 0.050 m^2/g and 6.0 m^2/g.

TABLE 5

| | BET Surface Area |
|---|---|
| | BET m^2/g |
| Comparative Example 1 | 0.024 |
| Example 7 | 0.086 |
| Example 8 | 3.263 |

In some embodiments the coherent irregular network can be made very thin, as thin as a monolayer of the thermoplastic particles used to create it, such as less than 20 um thick. In other embodiments, the coherent irregular network can be made thicker, such as greater than 20 um thick, greater than 50 um thick, greater than 100 um thick, greater than 250 um thick, greater than 1 mm thick, or between 20 um and 1 mm thick, or between about 25 um and 500 um or between about 25 um and 250 um thick. The thickness of the coherent irregular network can be selected depending on the requirements of the application it is intended.

Figure 10:
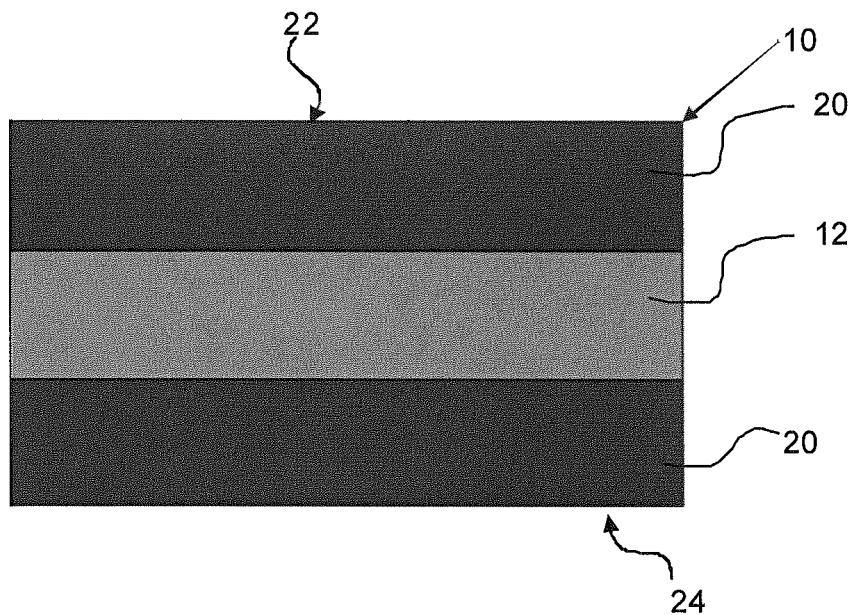
FIG. 10 is a cross sectional depiction of an exemplary embodiment of the porous article.
Figure 11:
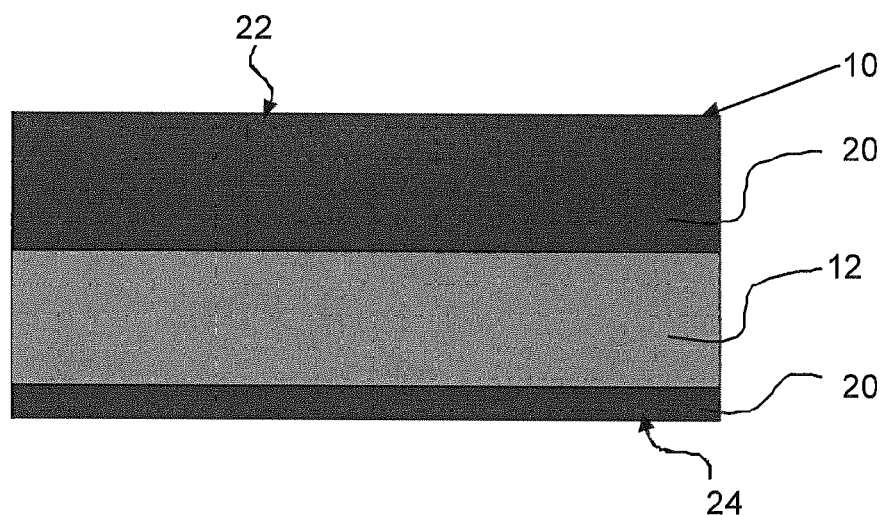
FIG. 11 is a cross sectional depiction of an exemplary embodiment of the porous article.

In one embodiment a coherent irregular network is attached to one side of the expanded fluoropolymer layer as depicted in FIG. 2 and FIG. 3B. In another embodiment, a coherent irregular network is attached to either side of the expanded fluoropolymer layer, as depicted in FIG. 10 and FIG. 11, providing a coherent irregular network 20 as the first surface 22 and the second surface 24 of the porous article 10. In yet another embodiment, two different types of coherent irregular network are attached to either side of the expanded fluoropolymer layer as depicted in FIG. 11, where the coherent irregular network 20 on the second surface 24 is depicted as being considerably thinner than the coherent irregular network 20 on the first surface 22. In addition, in embodiments where different coherent irregular network are attached to either side of an expanded fluoropolymer, the coherent irregular networks, or coherent irregular networks may comprise or be produced from different types, sizes, arrangement, or ratios of particles.

For example, the thickness ratio of the expanded fluoropolymer to the coherent irregular may vary considerably, for example from about 1:1 to about 1:10, 1:20, 1:50, 1:100, or 1:200 and all ranges in between.

The ratio could also be higher than 1:200. Further, the ratio of the coherent irregular network to the expanded fluoropolymer may also vary considerably, for example, from about 1:1 to about 1:10, 1:20, 1:50, 1: 100, or 1:200 and all ranges in between. The ratio could also be higher than 1:200.

Figure 12:
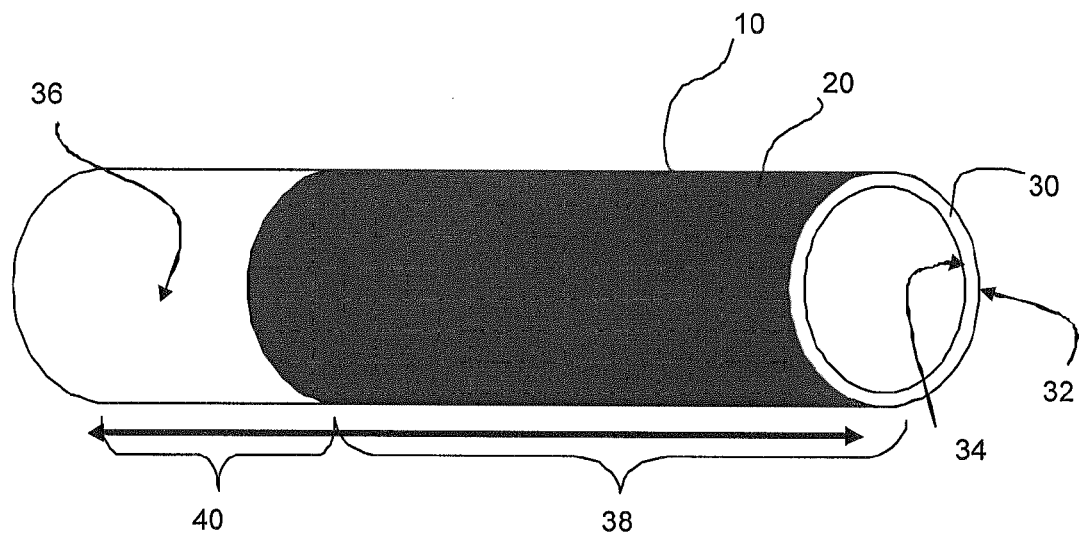
FIG. 12 is an isometric depiction of an exemplary embodiment of the porous article.

The porous article can be made in the form of a sheet, tube or rod. It is well known that expanded fluoropolymer and in particular, expanded PTFE can be made into sheets, or membranes, tubes, or rods. The coherent irregular network could be attached to the expanded fluoropolymer layer in the sheet, tube or rod form, or the porous article in sheet form could be wrapped to form a tube or wound to make a rod. As depicted in FIG. 12, the porous article 10 comprises a coherent irregular network 20 attached to an expanded fluoropolymer tube 30 over only a portion of the overall length 36, as depicted by length 38, and an uncoated length 40. The coherent irregular network is depicted as being on the outer diameter 32 of the expanded fluoropolymer tube, but could also be on the inner diameter 34.

It has been surprisingly found that the permeability of the expanded fluoropolymer in some embodiments is not significantly reduced by attaching of the coherent irregular network. This was demonstrated by comparing the permeability of the expanded fluoropolymer with the permeability of a porous article after attaching the coherent irregular network to the aforesaid expanded fluoropolymer; and this data is reported in Table 6 and Table 7. In particular, it was surprising that an expanded fluoropolymer having an initial high permeability, 100 Frazier or 0.24 krayls, maintained a 77 Frazier, 0.32 krayls, after the attachment of a coherent irregular network, as described in Example 5. Furthermore, Example 5 demonstrates that the coherent irregular network can greatly increase the strength of expanded fluoropolymers, and in particular, highly permeable expanded fluoropolymers. The ball burst value for the expanded fluoropolymer used in Example 5, was increase by the attachment of the coherent irregular network from 6.45N to 11.44N, or almost double.

TABLE 6

| | Expanded Fluoropolymer | Example 5 |
|---|---|---|
| Frazier Number | 100 | 77 |
| krayls | 0.24 | 0.32 |
| Ball Burst (Newtons) | 6.45 | 11.44 |

The permeability of relatively low permeability expanded fluoropolymers, such as that used in the making of Example 6, was not significantly reduced by the attachment of the coherent irregular network as reported in Table 7.

TABLE 7

| | Expanded Fluoropolymer C | Example 6 |
|---|---|---|
| Gurley/(seconds) | 13.2 | 13.9 |
| Krayls | 104 | 109 |

In some embodiments the attachment of the coherent irregular network can greatly improve the abrasion resistance of the expanded fluoropolymer while not significantly reducing permeability, bubble point or a desired combination thereof. As shown in Table 8, the attachment of the coherent irregular network to Membrane A, as described in Example 1, increased the cycles to failure in a Martindale abrasion test, as described herein, from 40 to 150 cycles.

TABLE 8

| Martindale Abrasion | Expanded Fluoropolymer A | Example 1 |
|---|---|---|
| Cycles to Failure | 40 | 150 |

Expanded fluoropolymers typically have a relatively smooth surface, which is undesirable in some applications. The coherent irregular network of the present invention has a much rougher surface than that of the expanded fluoropolymer. In some applications such as but not limited to vents, filters, apparel or the like, a rough surface will facilitate liquid roll off, especially where the porous article is treated to make it oleophobic. The surface roughness as measured following the procedure described herein, are reported in Table 9. The Sa value is the average roughness or deviation of all points from a plane fit to the test part surface, or the arithmetical mean of the deviations from the mean. The Sa values of the coherent irregular networks tested were at least an order of magnitude greater than the Sa value for the expanded fluoropolymer, and the FEP extruded film. The coherent irregular network of the present invention can be made to have a Sa value of approximately 12 or more, greater than 20, greater than 40 or between 12 and 60 um. The Sp value is the height between the highest peak and the mean plane. The Sp values for the coherent irregular networks were approximately 30 times and 15 times greater than the expanded fluoropolymer and FEP film respectively. The coherent irregular network of the present invention can be made to have a Sp value of approximately 50 or more, greater than 100, greater than 200 or between 50 and 300 um.

TABLE 9

Surface Roughness:

| Example | Description | Sa | Sq | Sp | Sv | St | Ssk | Sku | Sz |
|---|---|---|---|---|---|---|---|---|---|
| | Membrane A | 0.63 | 0.808 | 3.62 | 2.77 | 6.39 | 0.408 | 3.79 | 5.59 |
| Comp. 1 | FEP Film | 0.906 | 1.19 | 7.65 | 8.21 | 15.9 | 0.367 | 6.59 | 10.6 |
| 1 | 1st Surface | 44.2 | 53.7 | 228 | 428 | 656 | 0.116 | 6.16 | 604 |
| 2 | 1st Surface | 40.5 | 46.1 | 118 | 69.9 | 188 | 0.435 | 1.96 | 180 |
| 3 | 1st Surface | 34.7 | 61.8 | 248 | 681 | 929 | −4.73 | 56.9 | 880 |
| 4 | 1st Surface | 17.5 | 22.9 | 116 | 218 | 334 | −0.485 | 7.52 | 254 |
| 6 | 1st Surface | 31.1 | 39.8 | 215 | 223 | 438 | −0.73 | 4.72 | 351 |
| 7 | 1st Surface | 300 | 17 | | | | | | |

The porous article may be affixed to a support layer such as but not limited to a woven, or non-woven fabric, mesh, screen, felt, or another expanded fluoropolymer. The support layer 46 as depicted in FIG. 9 may be attached to the expanded fluoropolymer 12, or coherent irregular network 20 with discontinuous attachments 44, to provide additional dimensional stability, stiffness, strength or the like. Discontinuous attachments may be an adhesive, or adhesive netting or fabric, point bonding using heat and or pressure, or ultrasonic welding and the like.

The coherent irregular network can be made by attaching the elements or particles together first and then attaching the coherent irregular network to the expanded fluoropolymer layer. The coherent irregular network can be made by attaching the particles to each other while attaching some of the particles to the expanded fluoropolymer. A coherent irregular network can be affixed to one side of the expanded fluoropolymer, and then a second coherent irregular network can be affixed, either to the same surface or to opposing surface.

The particles or elements used to make the coherent irregular network can be attached by heating, using any conventional heating source, such as convection oven, hot plate, radiant heat or the like. Alternatively, the particles may be attached to each other or to the expanded fluoropolymer by induction heating or ultrasonic heating.

In one embodiment, the coherent irregular network is created by coating one surface of an expanded fluoropolymer with particles of FEP, powder A. The coated expanded fluoropolymer is then heated to a sufficient temperature and time to cause the FEP powder to attach both to itself forming a coherent irregular network and to the expanded fluoropolymer.

Figure 13A:
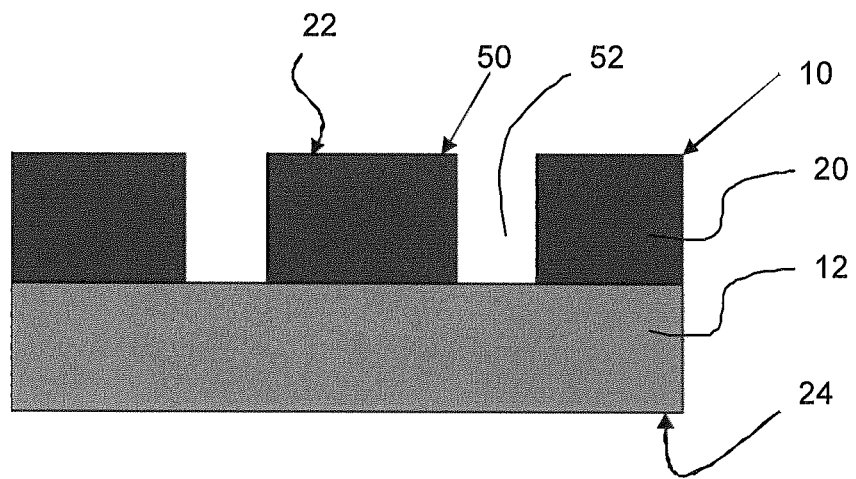
FIG. 13A is a cross sectional depiction of an exemplary embodiment of the porous article.
Figure 13B:
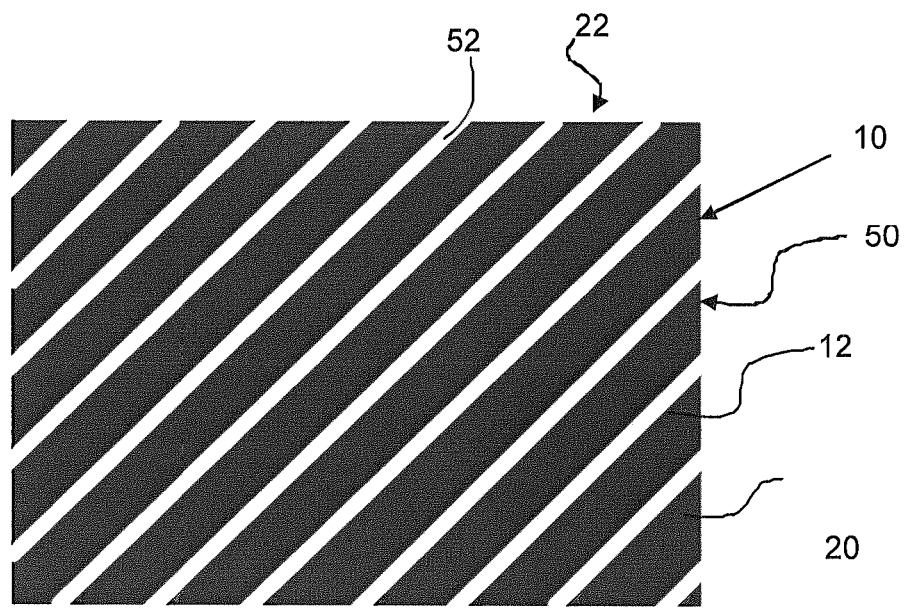
FIG. 13B is a surface depiction of an exemplary embodiment of the porous article.
Figure 14:
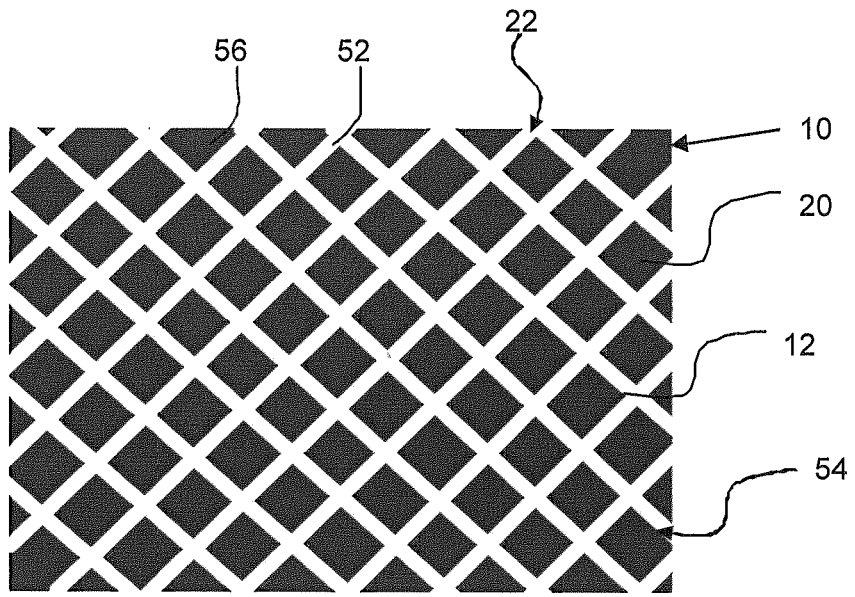
FIG. 14 is a surface depiction of an exemplary embodiment of the porous article.
Figure 15:
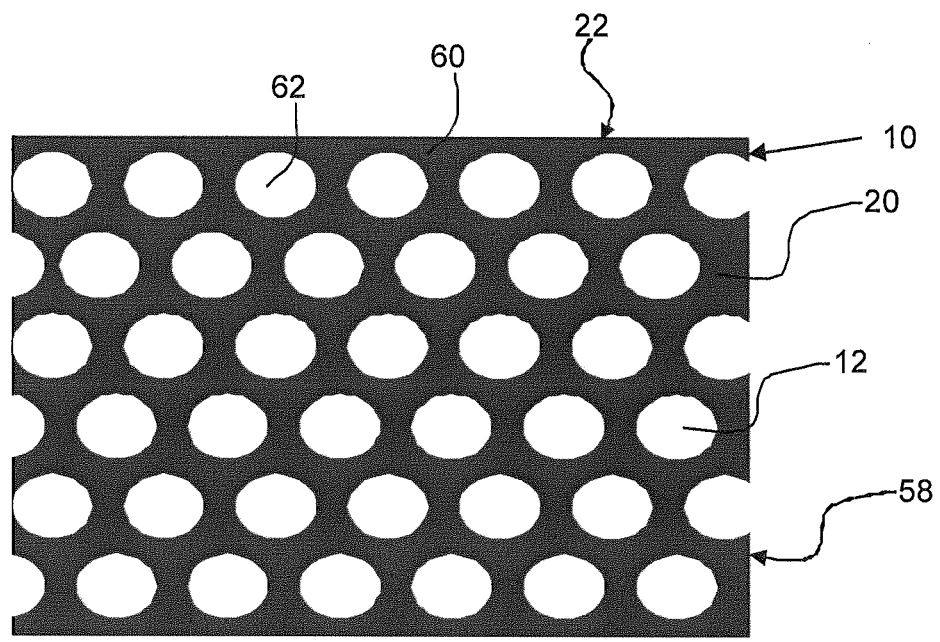
FIG. 15 is a surface depiction of an exemplary embodiment of the porous article.
Figure 16A:
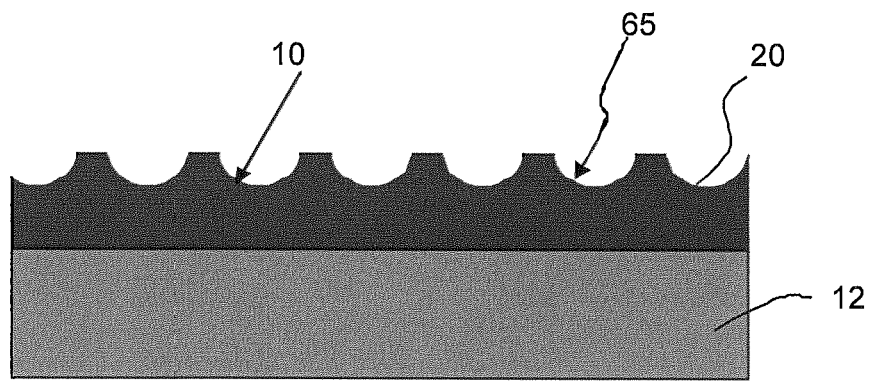
FIG. 16A is a cross sectional depiction of an exemplary embodiment of the porous article.
Figure 16B:
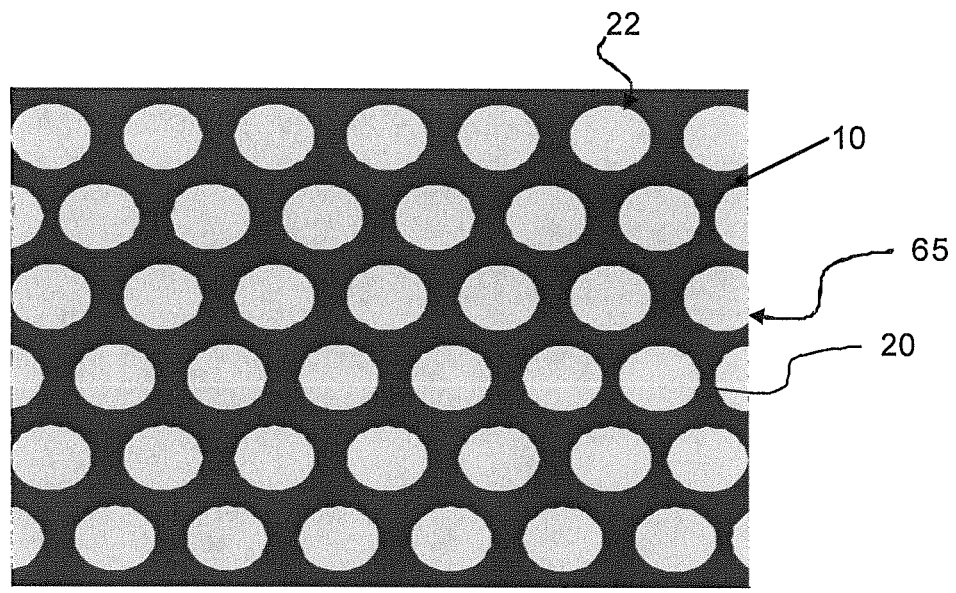
FIG. 16B is a surface depiction of an exemplary embodiment of the porous article.

In yet another embodiment, the coherent irregular network can be made in a pattern as shown in FIG. 13A through FIG. 16B. The pattern may be any pattern that changes properties such as thickness or density, of the coherent irregular network over the surface and, or through the thickness of the network. A linear pattern 50, as defined herein and depicted in FIG. 13A and FIG. 13B, is a pattern comprising multiple and relatively parallel lengths of coherent irregular network 20 between parallel lengths of open area 52, where there is no coherent irregular network 20 on the expanded fluoropolymer 12. In another embodiment, a discrete pattern 54 as defined herein and depicted in FIG. 14, comprises discrete sections of coherent irregular network 56 surrounded by open areas 52. In yet another embodiment, a connected pattern 58, as defined herein and depicted in FIG. 15, comprises connected coherent irregular network 60 and discrete open area 62. In yet another embodiment, the porous article may comprise an embossed pattern 65 as depicted in FIGS. 16A and 16B wherein the coherent irregular network has a substantially regular change in thickness over the surface. The embossed pattern may take on the general features of a linear, discrete or connected pattern where the thinner areas are configured in the material as opposed to the open areas. The pattern may be selected to provide specific properties for the application for which it is intended. For example, a linear pattern or discrete pattern may be used when flow across the surface is important.

The pattern in the coherent irregular network can be produced by using a mask when the particles or elements are applied to a surface, or a pattern may be formed by pressing a pattern, using heat and or pressure, into the material before, during or after the particles are attached to each other. In addition, a pattern can be created by dispersing particles intermittently as the expanded fluoropolymer material is indexed past a particle application area. In yet another embodiment the pattern is produced by removing material to create the pattern.

The inventive porous article can be rendered oleophobic by various techniques, thereby making them fit for use in certain applications, for example, venting applications where the material has high air flow and high water entry pressure and is resistant to penetration by low surface tension fluids like oil. As used in this application, the term "oleophobic" means an article with an AATCC Test Method 118-2002 oil rating of greater than about 2. For example, the porous article may be coated with a solution of perfluorodioxole polymer as described in U.S. Pat. No. 5,116,650. The coating may also be applied to at least one of the elements of the porous article before affixing them together. For example, the expanded fluoropolymer may be treated with a coating solution to provide oleophobicity before the coherent irregular network is attached or applied to it.

The porous article can be rendered hydrophilic by various techniques making them usable in liquid filtration applications which involve, for example, filtration of aqueous fluids. Hydrophilic as used herein is defined as a material that is water-wetting, such that water will penetrate through the material from the first surface to a second surface with low pressure, less than 10 kPa.

The porous article of the present invention can be made to be dimensionally stable at high temperatures. Expanded fluoropolymer materials can shrink dramatically when exposed to high temperatures. For example, the data reported in Table 10, shows that an expanded PTFE membrane, Membrane C, when heated to 150° C. for 5 minutes shrunk approximately 72% in area, whereas the same membrane having a coherent irregular network attached thereto, made according to Example 9, only shrunk 6%. The porous articles of the present invention are herein defined as being dimensionally stable when they have less than 20% area shrinkage when tested according to the Dimensional Stability test described herein.

TABLE 10

Dimensional Stability:

|  | Membrane C | Example 9 |
|---|---|---|
| Dimension After Heating/(cm) | 15.2 × 3.8 | 19.7 × 9.8 |
| Percent Area Shrinkage | 72% | 6% |

A comparative example of a discontinuous fluoroplastic and ePTFE membrane composite was made and tested for dimensional stability. The expanded membrane was made following the teaching of U.S. application Ser. No. 11/738,761 to Bacino et. al, and was made with and without a discontinuous surface layer of FEP, Example 11 and 10 respectively. A coherent irregular network was attached to the ePTFE membrane, Example 10, and to the discontinuous surface layer side of Example 11, producing Example 12 and 13 respectively. All four samples were tested for thermal dimensional stability as described herein and the results are reported in Table 11. The two samples without the coherent irregular network had an area shrinkage of approximately 70%, whereas the samples with the coherent irregular network had less than 3% area shrinkage.

TABLE 11

| Example # | Thickness um | Area Mass g/m^2 | Frazier number | krayls kPa-sec/m | Dimensions After Heating cm | Area Shrinkage % |
|---|---|---|---|---|---|---|
| 10 | 6.35 | 1 | 2.1 | 11.7 | 13.97 × 4.445 | 70.1 |
| 11 | 5.08 | 1.1 | 1.2 | 20.4 | 16.51 × 3.81 | 69.7 |
| 12 | 152.4 | 111 | 1.28 | 19.1 | 20 × 10.16 | 2.1 |
| 13 | 190.5 | 155 | 0.695 | 35.2 | 20.16 × 10.16 | 1.3 |

Data measured for the porous articles made and described in the examples are provided in Table 12.

TABLE 12

| EXP # | Gurley seconds | Frazier Number | krayls kPa-s/m | Thickness um | Area Mass g/m^2 | Bubble Point kPa |
|---|---|---|---|---|---|---|
| 1 | 10.9 |  | 85.2 | 259 | 109 | 101 |
| 2 | 7.3 |  | 57.5 | 207 | 84.4 | 103 |
| 3 | 8.2 |  | 64.1 | 254 | 136 | 101 |
| 4 |  | 46.4 | 1.9 | 152 | 93.4 | 3.8 |
| 5 |  | 77 | 3.1 |  |  |  |
| 6 |  | 40 | 1.6 |  | 102 | 711 |
| 7 |  | 339 | 13.8 | 191 | 172 |  |
| 9 | 7.8 |  | 61.2 |  |  | 543 |
| 10 |  | 2.1 | 11.7 | 6.35 | 1 |  |
| 11 |  | 1.2 | 20.4 | 5.08 | 1.1 |  |
| 12 |  | 1.28 | 19.1 | 152.4 | 111 |  |
| 13 |  | 0.695 | 35.2 | 190.5 | 155 |  |

Additional Definitions:

Porous article as used herein is defined a material having a first surface and a second surface, and pores there between, wherein a fluid, air or gas, can pass from the first to the second surface when a pressure is applied; for example materials having a gurley value of less than 500 seconds or approximately 4,000 krayls is considered porous for the purposes of this patent.

Coherent irregular network as used herein is defined as particles or elements of fluoroplastic attached together, such as through melting or fusing together, to form a porous and permeable material that consists essentially of non-homogenous elements, wherein homogeneous elements would have a constant cross-sectional shape over a significant portion of length.

Attached as used herein is defined as joining to materials together such that it takes a measurable force to separate them from each other such as greater. (Force of gravity)

Adjacent region as used herein is defined as a region between a permeable layer and the expanded fluoropolymer layer and in the embodiment wherein a permeable layer is affixed to either side of the expanded fluoropolymer, there is an adjacent region on either side of the expanded fluoropolymer.

Free Standing as used herein is defined as a material that has enough mechanical integrity to be handled on its own, free of support or attachment to another material. For example, the free standing material could be placed on an expanded fluoropolymer and attached.

Contiguous as used herein is defined as a surface that is connected throughout in an unbroken sequence.

Test Methods

Thermal Dimensional Stability:

A sample of sheet material was cut to 15.2 by 3.8 cm and place on a thin aluminum pan, covered loosely with aluminum foil to protect the sample but not restrict it, and then place in an oven preheated to a set temperature of 150 C. The pan was removed from the oven after 5 minutes. The pan was allowed to cool and then the sample was removed from the pan and the dimensions were measure. A percent shrinkage was then calculated and these results are reported in Table 10.

Melt Flow Index (MFI)

Powders used to make the coherent irregular network were tested for Melt Flow Index (MFI) following the general teachings of ASTM D1238, Standard Test Method for Melt Flow Rates of Thermoplastics by Extrusion Plastometer. In particular, procedure A was generally followed using a temperature of 372 C and a 216 Kg load. This is detailed in Section 8 of the ASTM.

This test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. The units of measure are grams of material/10 minutes (g/10 min). It is based on the measurement of the mass of material that extrudes from the die over a given period of time. It is generally used for materials having melt flow rates that fall between 0.15 and 50 g/10 min.

Particle Size

Particle size was measured using a Honeywell Microtrac ASVR and a Microtrac X100 Laser. An 80 ml beaker was filled with isopropyl alcohol (IPA), and then approximately 2g of sample was placed in the beaker. The beaker was then stirred for approximately 3 to 4 minutes using a Caframo Type RZRI (Wiarton, Canada) mixer. The bath area of the Microtrac was filled with IPA and the flow was turned on. When the background reading on the microtrac read zero, the test sample was slowly added until the Microtrac signaled it was ready. Three measurements were taken for each sample. The data reported from this test includes:

MV—Mean diameter in microns of the "volume distribution" represents the center of gravity of the distribution. Mie or modified Mie calculations are used to calculate the distribution. Implementation of the equation used to calculate MV will show it to be weighted (strongly influenced) by a change in the volume amount of large particles in the distribution. It is one type of average particle size or central tendency.

MN—Mean diameter, in microns, of the "number distribution" is calculated using the volume distribution data and is weighted to the smaller particles in the distribution. This type of average is related to population or counting of particles.

MA—Mean diameter, in microns, of the "area distribution" is calculated from the volume distribution. This area mean is a type average that is less weighted (also less sensitive) than the MV to changes in the amount of coarse particles in the distribution. It represents information on the distribution of surface area of the particles of the distribution.

CS—Calculated surface—Provided in units of M2/cc, the value provides an indication of the specific surface area. The CS computation assumes smooth, solid, spherical particles. It may be converted to classical units for SSA of M2/g by dividing thru value by the density of the particles. It should not be interchanged with BET or other adsorption methods of surface area measurement since CS does not take into effect porosity of particles, adsorption specificity or topographical characteristics of particles.

SD—Standard Deviation in microns, also known as the Graphic Standard Deviation (ag), is one measure of the width of the distribution. It is not an indication of variability for multiple measurements. Equation to calculate is: 84%-16%)/2.

Thickness Measurements

Thickness was measured by placing the material between the two plates of a Kafer FZ1000/30 thickness snap gauge (Käfer Messuhrenfabrik GmbH, Villingen-Schwenningen, Germany). The average of the three measurements was used. In some cases a Mitutoyo Snap Gauge—JVD028 No. 2804S-10, (Kanagawa, Japan), was used to measure the thickness of the sample.

Percent Porosity

The area mass and thickness of the sample was used to calculate the percent porosity. The area mass of the sample was divided by the thickness to determine the density of the sample ($\rho s$). The percent porosity was then calculated using the following formula:

$$\% \text{ porosity} = \frac{(\rho m - \rho s)}{\rho m}$$

in which: $\rho m$=density (g/cc) of the raw material. For example ,the density value used for FEP was 2.14 g/cc.

Bubble Point Measurements

The bubble point and mean flow pore size were measured according to the general teachings of ASTM F31 6-03 using a Capillary Flow Porometer (Model CFP 1500 AEXL from Porous Materials Inc., Ithaca, N.Y.). The sample membrane was placed into the sample chamber and wet with SilWick Silicone Fluid (available from Porous Materials Inc.) having a surface tension of 19.1 dynes/cm. The bottom clamp of the sample chamber had a 2.54 cm diameter, 3.175 mm thick porous metal disc insert (Mott Metallurgical, Farmington, Conn., 40 micron porous metal disk) and the top clamp of the sample chamber had a 3.175 mm diameter hole. Using the Capwin software version 6.62.1 the following parameters were set as specified in the table below. The values presented for bubble point and mean flow pore size were the average of two measurements.

| Parameter | Set Point |
|---|---|
| maxflow (cc/m) | 200000 |
| bublflow (cc/m) | 100 |
| F/PT (old bubltime) | 40 |
| minbppres (PSI) | 0 |
| zerotime (sec) | 1 |
| v2incr (cts) | 10 |
| preginc (cts) | 1 |
| pulse delay (sec) | 2 |
| maxpre (PSI) | 500 |
| pulse width (sec) | 0.2 |
| mineqtime (sec) | 30 |
| presslew (cts) | 10 |
| flowslew (cts) | 50 |
| eqiter | 3 |
| aveiter | 20 |
| maxpdif (PSI) | 0.1 |
| maxfdif (cc/m) | 50 |
| sartp (PSI) | 1 |
| sartf (cc/m) | 500 |

Permeability Gurley Measurements

The Gurley air flow test measures the time in seconds for 100 cm$^3$ of air to flow through a 6.45 cm$^2$ sample at 12.4 cm of water pressure. The samples were measured in a Gurley Densometer Model 4340 Automatic Densometer. The average of the three measurements was used.

Permeability Testing: Frazier

Textest Instruments, FX3310—Schwerzenbach, Switzerland test pressure set to 125 Pa, measure in CFM Surface Area Measurements/(BET)

The surface area per unit mass, expressed in units of m$^2$/g, of the ePTFE membrane was measured using the Brunauer-Emmett-Teller (BET) method on a Coulter SA3100 Gas Adsorption Analyzer (Beckman Coulter Inc., Fullerton, Calif.). A sample was cut from the center of the ePTFE membrane sheet and placed into a small sample tube (reference number 8201151). The mass of the ePTFE sample was approximately 0.1 to 0.2 grams. The tube was placed into the Coulter SA-Prep Surface Area Outgasser, (Model SA-PREP, P/N 5102014) from Beckman Coulter Inc., Fullerton, Calif. and purged at 110 C for 2 hours with helium. The sample tube was then removed from the SA-Prep Outgasser and weighed. The sample tube was then placed into the SA3100 Gas Adsorption Analyzer and the BET surface area analysis was run in accordance with the instrument instructions using helium to calculate the free space and nitrogen as the adsorbate gas. A single measurement was recorded for each sample.

Surface Roughness Measurements

The surface roughness of the porous articles was measure using a Nanovea ST400 Series from Micro Photonic, Inc. The following parameters were set:

Scan parameters: 2 mm×2 mm area with 25 um steps both x and y directions
Surface dimension: Area
Starting Position: Center
Single Direction:
Pen: 3500 Optical
CHR Acquisition: 30 hz Various parameters were measures as describe below:
1. Sa—Arithmetical mean of the deviations from the mean. The average roughness or deviation of all points from a plane fit to the test part surface $$Sa = \frac{1}{NM} \sum_{x=0}^{N-1} \sum_{y=0}^{M-1} |z_{x,y}|$$

2. Sq—Quadratic mean of the deviation from the mean. Computes the efficient value for the amplitudes of the surface (RMS).

$$Sq = \sqrt{\frac{1}{NM} \sum_{x=0}^{N-1} \sum_{y=0}^{M-1} z_{x,y}^2}$$

3. Sp—highest peak of the surface. Height between the highest peak and the mean plane.
4. Sv—Deepest valley of the surface. Depth between the mean plane and the deepest valley.
5. St—Total height of the surface. Height between the highest peak and the deepest hole.
6. Ssk—Symmetry of the distribution curve of depths. A negative Ssk indicates that the surface is composed with principally one plateau and deep and fine valleys. In this case, the distribution is slopping to the top. A positive Ssk indicates a surface with lots of peaks on a plane. The distribution is slopping to the bottom. Due to the big exponent used, this parameter is very sensitive to the sampling and to noise of the measurement.

$$Ssk = \frac{1}{NMS_q^3} \sum_{x=0}^{N-1} \sum_{y=0}^{M-1} z_{x,y}^3$$

7. Sku—Flatness of the distribution curve of depths. Due to the big exponent used, this parameter is very sensitive to the sampling and to the noise of the measurement.

$$Sku = \frac{1}{NMS_q^4} \sum_{x=0}^{N-1} \sum_{y=0}^{M-1} z_{x,y}^4$$

8. Sz—Height of the 10 points of the surface. Mean of the distance between 5 highest peaks and 5 deepest holes over the evaluation length. A neighborhood of 3×3 is taken into account to find out the peaks and the valleys.

$$Sz = \frac{(P1 + P2 \ldots P5) - (V1 + V2 \ldots V5)}{5}$$

Abrasion Resistance Test

Abrasion was tested as per ASTM D4966, "Standard Test Method for Abrasion Resistance of Textile Fabrics (Martindale Abrasion Tester Method)" using a Martindale Abrasion test apparatus with the following modifications. A 6.25" diameter circle specimen was placed over the standard piece of felt on the testing table face up, so the film surface of the sample is subject to abrasion challenge. The specimen in the specimen holder was replaced by a 1.5" diameter circle of the hook side of hook and loop fastener with the hooks facing down so that they challenge the sample. This material is nylon hook obtainable from Norman Shatz Co. of 3570 East Street Road, Bensalem, Pa. 19020 as "Two inch wide Black Hook".

Abrasion movements were conducted at regular intervals with hydrostatic resistance measurements made at the end of each movement interval. Initially, the movement interval is 25 movements until 50 movements are reached.

Liquidproof testing was conducted as follows. Samples were tested for liquidproofness by using a modified Suiter test apparatus with water serving as a representative test liquid. Water is forced against a sample area of about 4¼-inch diameter sealed by two rubber gaskets in a clamped arrangement. Samples are tested by orienting the sample so that the outer film surface of the sample is the surface against which water is forced. The water pressure on the sample is increased to about 1 psi by a pump connected to a water reservoir, as indicated by an appropriate gauge and regulated by an in-line valve. The test sample is at an angle, and the water is recirculated to assure water contact and not air against the sample's lower surface. The surface opposite the outer film surface of the sample is observed for a period of 3 minutes for the appearance of any water which would be forced through the sample. Liquid water seen on the surface is interpreted as a leak. A passing (liquidproof) grade is given for where no liquid water is visible on the sample surface within 3 minutes. A sample is "liquidproof" as used herein, if it passes this test. Samples having any visible liquid water leakage, e.g. in the form of weeping, pin hole leak, etc. are not liquidproof and fail the test. The number of abrasion cycles to liquidproof failure are reported in Table 8. The ePTFE membrane used to make the porous article of example 2 was tested as a control and had 40 cycles to liquidproof failure, whereas the sample made according to example 2 had 150 cycles to liquidproof failure.

The following examples are intended to be illustrative of the invention, but are not to be construed as limiting the scope of the invention in any way.

Porous Article Preparation Method

Figure 17:
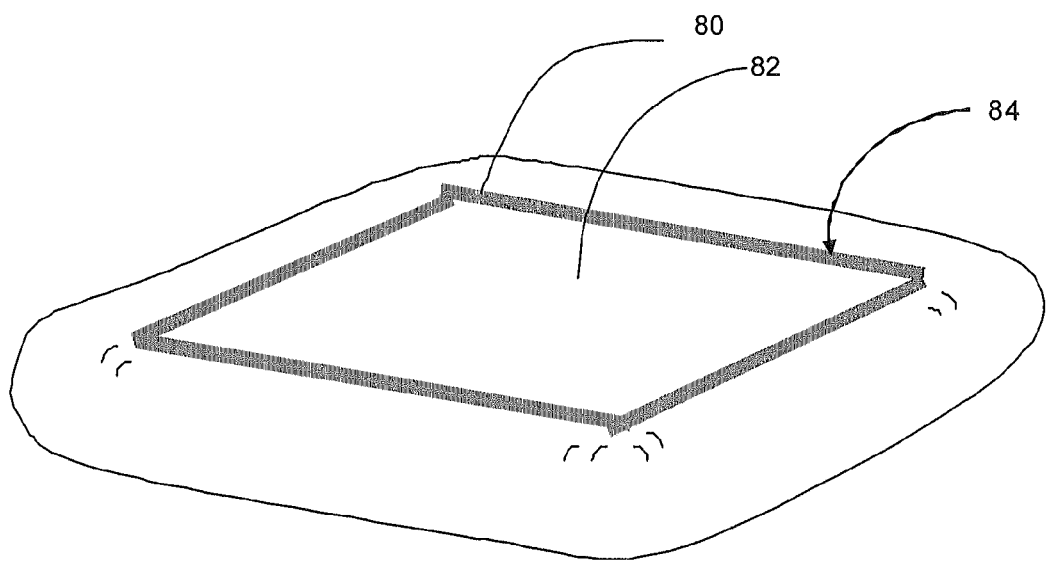
FIG. 17 is an isometric depiction of a pin frame with an expanded fluoropolymer membrane perforated by the pins.
Figure 18:
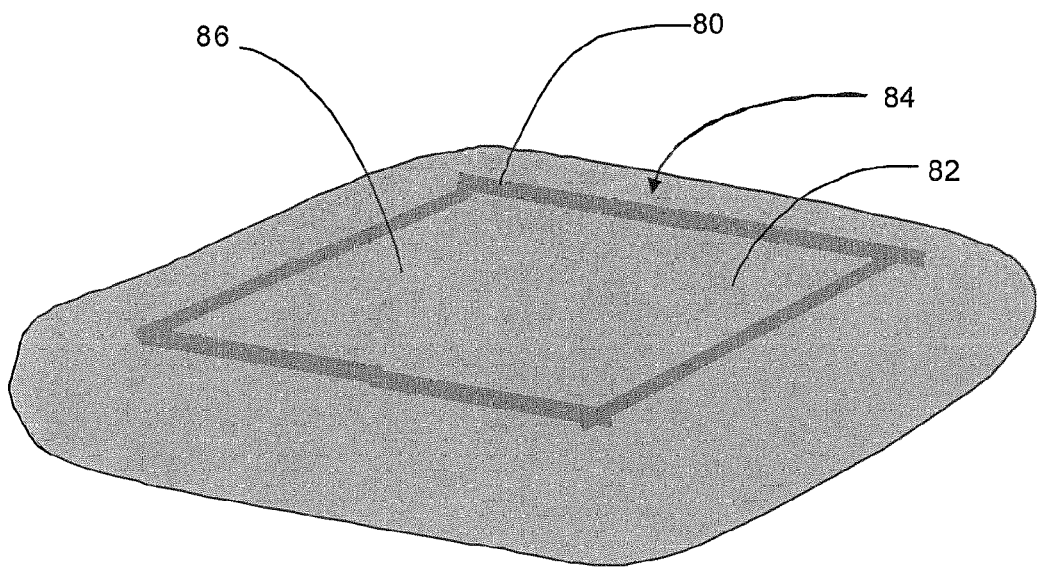
FIG. 18 is an isometric depiction of a pin frame with an expanded fluoropolymer membrane perforated by the pins and particles dispersed thereon.

A sample of expanded PTFE membrane 82 as described in Table 1 was placed on a 30.5 cm×30.5 cm pin frame 80 having 12 mm high pins 84 spaced approximately every 12 mm as depicted in FIG. 17. Powder or blends of powder, was placed in a US Standard Series Sieve, Sieve #80 (Dual Manufacturing Co. Chicago, Ill.) having 0.180 mm openings. The Sieve was tapped to disperse the thermoplastic particles 86 onto the ePTFE sample 82, as depicted in FIG. 18. The pin frame was then place onto an aluminum tray 90 measuring approximately 36 cm by 36 cm having approximately a 1 cm high edge around the perimeter as depicted in FIG. 19 . A lid measuring 36 cm by 36 cm having approximately a 5 cm high edge around the perimeter was placed over the sample. The covered sample was then heated; it was placed into a Despatch V Series Oven (Despatch Industries, Minneapolis, Minn.), set to a temperature of 305 C for approximately 15 minutes and then the lid was removed and the sample was left in the oven for another 5 minutes before it was removed, to produce a porous article having a coherent irregular network of thermoplastic particles fused together and attached to an expanded fluoropolymer membrane.

All porous articles made in the following examples followed the general procedure described, unless otherwise noted in the example.

EXAMPLE 1

A porous article was made according to the porous article preparation method, by dispersing FEP powder, NC1500

(Daikin, Japan), as described herein as Powder A, onto ePTFE membrane as described herein as Membrane A and heating in the oven as described in the porous article preparation method, except that it was left in the oven for 8 minutes after removal of the lid. A porous article was produced having a coherent irregular network of thermoplastic particles fused together and attached to the expanded fluoropolymer membrane as shown in the SEM image in FIG. 1.

This porous article was then characterized by measuring various properties in the manner described herein, and data for the sample made according to this example appear in Table 9 and 12.

This sample was further evaluated for abrasion resistance according to the test method described herein. The ePTFE membrane used to make the porous article of Example 1 was tested as a control and had 40 cycles to liquidproof failure, whereas the sample made according to Example 1 had 150 cycles to liquidproof failure.

EXAMPLE 2

A porous article was made according to porous article preparation method, by dispersing a blend of 50% by weight Powder A and 50% by weight of Powder B onto Membrane A. The two powders were blended by placing them into a large container and rotating the container until the particles were blended. The powder coated sample was then placed in an oven according to the procedure in the porous article preparation method. A porous article was produced having thermoplastic particles fused together to form an coherent irregular network attached to an expanded fluoropolymer membrane as shown in the SEM images in FIG. 8A and FIG. 8B.

This porous article was then characterized by measuring various properties in the manner described herein, and data for the sample made according to this example appear in Table 9 and Table 12.

EXAMPLE 3

A porous article was made according to the porous article preparation method, by dispersing Powder A onto Membrane A, as described herein. The sample was placed in an oven according to the procedure in Example 1 and heated at 305 C for 15 minutes. After 15 minutes the lid was removed and the sample was left in the oven for another 5 minutes before it was removed. Directly after removal from the oven, Powder B was dispersed onto the sample, the lid was placed back over the sample and the covered sample was placed back in the oven, which was still set to a temperature of 305 C. The lid was removed from the sample after 5 minutes, and the sample was left in the oven for another 3 minutes.

A porous article was produced having thermoplastic particles fused together to form a coherent irregular network attached to an expanded fluoropolymer membrane as shown in the SEM images in Fig. FIG. 4A and FIG. 4B.

This porous article was then characterized by measuring various properties in the manner described herein, and data for the sample made according to this example appear in Table 9 and Table 12.

EXAMPLE 4

A porous article was made according to the porous article preparation method except that the Membrane A was secured to an approximately 30 cm diameter by 2.5 cm high hoop, with a hose clamp instead of being secured to a pin frame. Powder A was dispersed onto Membrane B, and heated according to the procedure in the porous article preparation method, including placing the sample on a tray and covering with a lid. A porous article was produced having thermoplastic particles fused together to form a coherent irregular network attached to an expanded fluoropolymer membrane.

The permeability of the sample was measured according to the method described herein and had an average of 51 Frazier. The sample was then placed back on the tray and covered with the lid and placed back into the oven set at a temperature of 305 C for another 15 minutes. After removing the sample from the oven again, the sample had an average permeability of 47.5 Frazier. The sample was then placed back on the tray and covered with the lid and placed back into the oven set at a temperature of 305 C for a third time for 15 minutes. After removing the sample from the oven yet again, the sample had an average permeability of 41.8 Frazier. The permeability averages are the average of two values measured. This porous article was then characterized by measuring various properties in the manners described herein and data for the sample made according to this example appear in Table 9 and Table 12.

EXAMPLE 5

A porous article was made according to the porous article preparation method except that the Membrane D was secured to an approximately 30 cm diameter by 2.5 cm high hoop, with a hose clamp instead of being secured to a pin frame. Powder A was dispersed onto Membrane D and heated according to the porous article preparation method. A porous article was produced having a permeable layer of thermoplastic particles fused together to form an coherent irregular network attached to an expanded fluoropolymer membrane. A porous article was produced having thermoplastic particles fused together to form a coherent irregular network attached to an expanded fluoropolymer membrane.

This porous article was then characterized by measuring various properties in the manner described herein, and data for the sample made according to this example appear in Table 6, and Table 12.

The ePTFE membrane used to make the porous article of this example, Membrane D, has high permeability but is very thin and weak, having a low ball burst value of only 6.4 newtons, whereas the porous article made with this membrane still has a high permeability but almost twice the ball burst value at 11.4 newtons.

EXAMPLE 6

A porous article was made according to the porous article preparation method except that the oven temperature was set to 220 C for the duration of heating the sample. Powder B was dispersed onto Membrane C, and the sample was heated as described. A porous article was produced having thermoplastic particles fused together to form a coherent irregular network attached to an expanded fluoropolymer membrane.

This porous article was then characterized by measuring various properties in the manner described herein and data for the sample made according to this example appear in Table 9, 10 and Table 12.

EXAMPLE 7

A permeable free standing material was made according to the porous article preparation method except that the Powder A was dispersed onto a 50 um thick skived PTFE film (Dewall, Saunderstown, R.I.) instead of an expanded membrane.

Figure 19B:
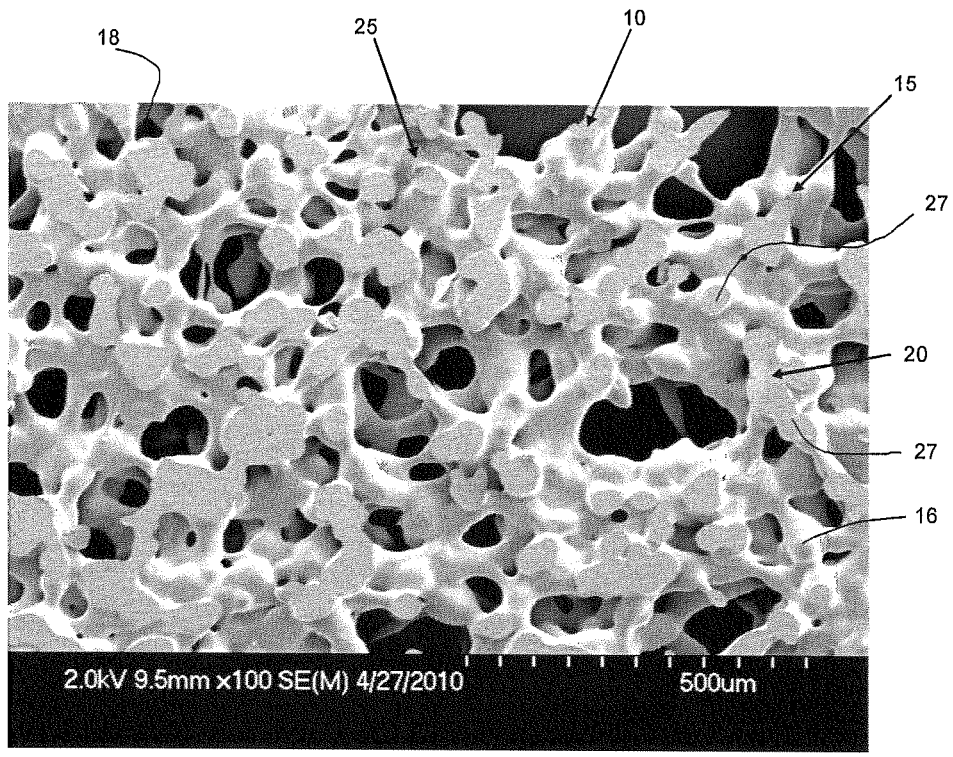
FIG. 19B is a SEM photomicrograph of a second surface of a free standing coherent irregular network.

Powder A was dispersed onto skived PTFE and the porous article preparation method was followed. After the sample was cool, the coherent irregular network was peel off of the skived PTFE producing a free standing porous article having a coherent irregular network of thermoplastic particles fused together as shown in SEM images of FIG. 19A and FIG. 19B. FIG. 19A shows the first surface 23 of the free standing material 15, and FIG. 19B shows the second surface 25 having flat surface regions 27. This permeable free standing material was then characterized by measuring various properties in the manner described herein and data for the sample made according to this example appear in Table 5, 9 and Table 12.

EXAMPLE 8

A permeable free standing material was made according to the porous article preparation method except that a mixture of 50% by weight Powder A and 50% by weight Powder C, was dispersed onto a 50 um thick skived PTFE film (Dewall, Saunderstown, R.I.) instead of an expanded membrane. The two powders were blended by placing them into a large container and rotating the container until the particles were blended. The powder was dispersed onto skived PTFE and the porous article preparation method was followed. After the sample was cool, the coherent irregular network was peel off of the skived PTFE producing a free standing porous article having a coherent irregular network of thermoplastic particles fused together. This permeable free standing material was then characterized by measuring various properties in the manner described herein and data for the sample made according to this example appear in Table 5. The percent porosity of the free standing material was approximately 57%

EXAMPLE 9

A porous article was made according to the porous article preparation method by dispersing Powder A onto Membrane C. The heating procedure according to the porous article preparation method except was followed. A porous article was produced having thermoplastic particles fused together to form a coherent irregular network attached to an expanded fluoropolymer membrane.

This porous article was then characterized by measuring various properties in the manner described herein and data for the sample made according to this example appear in Table 12.

This porous article was further evaluated for thermal dimensional stability. A rectangular sample, measuring 10.2 cm by 20.3 cm cut was from the Membrane C as well as a sample of the porous article made according the Example 9, such that the long dimension ran parallel with the longitudinal or machine direction. The cut rectangular samples were placed onto a metal tray and heated in a Despatch V Series Oven set to a temperature of 150 C for 5 minutes. The samples were removed and allowed to cool. The dimensions were measured and the percent shrinkage was calculated and appear in Table 10.

The porous article had a dramatically higher thermal dimensional stability as demonstrated by the low percent area reduction after exposure to elevated temperatures.

EXAMPLE 10

A porous expanded PTFE membrane was produced. Fine powder of PTFE polymer (Daikin Industries, Ltd., Orangeburg, N.Y.) was blended with Isopar K (Exxon Mobil Corp., Fairfax, Va.) in the proportion of 0.192 g/g of fine powder. The lubricated powder was compressed in a cylinder to form a pellet and placed into an oven set at 70° C. for approximately 12 hours. Compressed and heated pellet was ram extruded to produce a tape approximately 15.2 cm wide by 0.73 mm thick. The extruded tape was calendared between two compression rolls to a thickness of 0.254 mm. The tape was then transversely stretched to 56 cm (i.e., at a ratio of 3.7:1), then dried in an oven set at 250° C. The dry tape was longitudinally expanded between banks of rolls over a heated plate set to a temperature of 345° C. The speed ratio between the second bank of rolls and the first bank of rolls, and hence the expansion ratio, was 14:1. The longitudinally expanded tape was then expanded transversely at a temperature of approximately 350° C. to a ratio of approximately 15:1 and then constrained and heated in an oven set at 380° C. for approximately 20 seconds. This porous ePTFE was then characterized by measuring various properties in the manner described herein and data for the sample made according to this example appear in Table 12.

EXAMPLE 11

A porous composite was made generally following the teaching of U.S. patent application Ser. No. 11/738,761 to Bacino et. al. The process of Example 10 was followed except that a 12.5 micron thick FEP film was layered onto the PTFE tape prior to expansion over the plate. The speed ratio between the second bank of rolls and the first bank of rolls, and hence the expansion ratio, was also 14:1. The FEP film bonded to the PTFE tape as it melted and as the two layers expanded, rents were formed in the FEP film. The longitudinally expanded composite was then expanded transversely at a temperature of approximately 350° C. to a ratio of approximately 15:1 and then constrained and heated in an oven set at 380° C. for approximately 20 seconds. This porous composite was then characterized by measuring various properties in the manner described herein and data for the sample made according to this example appear in Table 12.

EXAMPLE 12

The porous composite made according to Example 11 was further processed into a porous article as described herein, according to the porous article preparation method. The porous composite was placed into the pin frame with the FEP side facing up, and the Powder A was dispersed onto this surface. The sample was then heated according to the porous article preparation method. A porous article was produced having thermoplastic particles fused together to form a coherent irregular network attached to an expanded fluoropolymer membrane. The coherent irregular network was in part attached to the discontinuous FEP surface of the porous composite.

EXAMPLE 13

The porous ePTFE membrane made according to Example 10 was further processed following the porous article preparation method. The porous composite was placed into the pin frame and Powder A was dispersed the surface. The sample was then heated according to the porous article preparation method. A porous article was produced having thermoplastic particles fused together to form a coherent irregular network attached to an expanded fluoropolymer membrane.

This articles made according to Example 10 through 13, were then characterized by measuring various properties in the manner described herein and data for the sample made according to this example appear in Table 12.

These same articles were evaluated for thermal dimensional stability as described herein and the data is reported in Table 11. The samples having a coherent irregular network attached to the ePTFE membrane had much less area shrinkage.

COMPARATIVE EXAMPLE

An approximately 50 um thick film of FEP (Daikin Industries, Ltd., Orangeburg, N.Y.), was tested for various properties and the data is reported in Table 5, 9 and 12.

The invention claimed is:

1. A porous article comprising:
   a porous expanded polytetrafluoroethylene (ePTFE) membrane; and
   a coherent irregular network comprising particles of at least one thermoplastic fluoropolymer fused together;
   wherein a surface of said porous ePTFE membrane comprises at least one adjacent region at which said coherent irregular network is attached
   wherein the coherent irregular network comprises open areas, and
   wherein at least one of the open areas is greater than about 100 μm in size.

2. The porous article of claim 1 having a specific resistance of less than about 2400 krayls and greater than about 0.24 krayls.

3. The porous article of claim 1, wherein the coherent irregular network comprises a plurality of voids and is affixed to said porous ePTFE membrane at only a portion of the at least one adjacent region.

4. The porous article of claim 1, wherein the coherent irregular network comprises bridging.

5. The porous article of claim 1, wherein the coherent irregular network is greater than about 5 μm thick.

6. The porous article of claim 1, wherein the coherent irregular network is greater than about 5 μm thick and less than about 500 μm thick.

7. The porous article of claim 1 having a Sp value greater than about 35 μm on at least one surface.

8. The porous article of claim 1, wherein the particles of the at least one thermoplastic fluoropolymer have an MFI between 0.3 g/10 min and 10 g/10 min when tested at 372° C. and 2.16 kg load.

9. The porous article of claim 1, wherein the particles of the at least one thermoplastic fluoropolymer consist essentially of fluorinated ethylene propylene (FEP).

10. The porous article of claim 9, wherein the FEP has a MFI of less than 1.0 g/10 min when tested at 372° C. and 2.16 kg load.

11. The porous article of claim 1, wherein the coherent irregular network has a BET surface area of at least about 0.35 m²/g.

12. The porous article of claim 1, wherein the coherent irregular network has a BET surface area between about 0.25 m²/g and about 5 m²/g.

13. The porous article of claim 1 having a percent area shrinkage of less than about 20%.

14. The porous article of claim 1, having a percent area shrinkage of less than about 5%.

15. The porous article of claim 1, further comprising a hydrophilic coating and wherein the porous article is hydrophilic.

16. The porous article of claim 1, further comprising an oleophobic coating and wherein the porous article is oleophobic.

17. The porous article of claim 1 in the form of a sheet.

18. The porous article of claim 1, further comprising a support layer.

19. The porous article of claim 18, wherein the support layer is affixed to said coherent irregular network.

20. The porous article of claim 18, wherein the support layer is affixed to said porous ePTFE membrane.

21. The porous article of claim 1, wherein the coherent irregular network further comprises a pattern.

22. The porous article of claim 21, wherein the coherent irregular network is in a linear pattern.

23. The porous article of claim 21, wherein the coherent irregular network is in a discrete pattern.

24. The porous article of claim 21, wherein the coherent irregular network is in a connected pattern.

25. The porous article of claim 1, wherein a ratio of thickness of the porous membrane to the coherent irregular network ranges from about 1:10 to about 1:200.

26. A porous article comprising:
   a porous expanded polytetrafluoroethylene (ePTFE) membrane;
   a first coherent irregular network comprising particles of at least one thermoplastic fluoropolymer fused together, said first coherent irregular network being attached to one side of said porous ePTFE membrane; and
   a second coherent irregular network comprising particles of at least one thermoplastic fluoropolymer fused together, said second coherent irregular network being attached to said eTPFE membrane on a side opposing said first coherent irregular network;
   wherein at least one of the first coherent irregular network and second coherent irregular network comprises open areas and,
   wherein at least one of the open areas is greater than about 100 μm in size.

27. The porous article of claim 26, wherein said first coherent irregular network and said ePTFE membrane have an attached area ratio between about 0.05 to 0.25.

28. The porous article of claim 26, wherein a surface of said porous ePTFE membrane comprises at least one adjacent at which at least one of said first coherent irregular network or said second coherent irregular network is attached.

29. The porous article of claim 26, wherein at least one of said first coherent irregular network and said second coherent irregular network further comprises a thermoplastic polymer.

30. The porous article of claim 26, wherein said second coherent irregular network and said ePTFE membrane have an attached area ratio between about 0.05 to 0.25.

31. A porous article comprising:
   a porous expanded fluoropolymer membrane: and
   a coherent irregular network comprising particles of at least one thermoplastic polymer fused together,
   wherein a surface of said porous expanded fluoropolymer membrane comprises at least one adjacent region at which said coherent irregular network is attached,
   wherein the coherent irregular network is attached to said expanded fluoropolymer membrane at only a portion of the adjacent region,
   wherein the coherent irregular network comprises open areas,
   wherein at least one of the open areas is greater than about 100 μm in size,
   wherein said at least one thermoplastic polymer is a thermoplastic fluoropolymer, and wherein the particles of the at least one thermoplastic fluoropolymer have an MFI between 0.3 g/10 min and 10g/10 min when tested at 372° C. and 2.16 kg load.

32. The porous article of claim 31, wherein the at least one thermoplastic polymer further comprises a first thermoplastic polymer and a second thermoplastic polymer.

33. The porous article of claim 32, wherein the first thermoplastic polymer and has a lower melting point than the second thermoplastic polymer.

34. The porous article of claim 31, wherein the at least one thermoplastic polymer further comprises a plurality of thermoplastic polymers.

35. The porous article of claim 31, having a specific resistance of less than about 2400 krayls and greater than about 0.24 krayls.

36. The porous article of claim 31, wherein said expanded fluoropolymer membrane is expanded polytetrafluoroethylene (ePTFE).

37. The porous article of claim 31, wherein the coherent irregular network comprises bridging.

38. The porous article of claim 31, wherein the coherent irregular network is greater than about 5μm thick.

39. The porous article of claim 31, wherein the coherent irregular network is greater than about 5 μm thick and less than about 500 μm thick.

40. The porous article of claim 31, having a Sp value greater than about 35 μm on at least one surface.

41. The porous article of claim 31, wherein the particles of the at least one thermoplastic fluoropolymer consist essentially of fluorinated ethylene propylene (FEP).

42. The porous article of claim 41, wherein the FEP has a MFI of less than 1.0 g/10 min when tested at 372° C. and 2.16 kg load.

43. The porous article of claim 31, wherein the coherent irregular network has a BET surface area of at least about 0.35 m$^2$/g.

44. The porous article of claim 31, wherein the coherent irregular network has a BET surface area between about 0.25 m$^2$/g and about 5 m$^2$/g.

45. The porous article of claim 31. having a percent area shrinkage of less than about 20%.

46. The porous article of claim 31, having a percent area shrinkage of less than about 5%.

47. The porous article of claim 31, further comprising a hydrophilic coating and wherein the porous article is hydrophilic.

48. The porous article of claim 31, further comprising an oleophobic coating and wherein the porous article is oleophobic.

49. The porous article of claim 31, further comprising a support layer.

50. The porous article of claim 49, wherein the support layer is affixed to said coherent irregular network.

51. The porous article of claim 49, wherein the support layer is affixed to said porous expanded fluoropolymer membrane.

52. The porous article of claim 31, wherein said coherent irregular network and said porous expanded fluoropolymer membrane have an attached area ratio between about 0.05 to 0.25.

53. A porous article comprising:
a porous expanded fluoropolymer membrane; and
a coherent irregular network comprising particles of at least one thermoplastic polymer fused together;
wherein a surface of said porous expanded fluoropolymer membrane comprises at least one adjacent region at which said coherent irregular network is attached,
wherein the coherent irregular network is attached to said expanded fluoropolymer membrane at only a portion of the adjacent region,
wherein said coherent irregular network and said expanded fluoropolymer membrane have an attached area ratio between about 0.05 to 0.25,
wherein said coherent irregular network comprises open areas,
wherein at least one of the open areas is greater than about 100 μm in size,
wherein said at least one thermoplastic polymer is a thermoplastic fluoropolymer, and
wherein the particles of the at least one thermoplastic fluoropolymer have an MFI between 0.3 g/10 min and 10g/10 min when tested at 372° C. and 2.16 kg load.

54. The porous article of claim 53, wherein the at least one thermoplastic polymer further comprises a first thermoplastic polymer and a second thermoplastic polymer.

55. The porous article of claim 54, wherein the first thermoplastic polymer and has a lower melting point than the second thermoplastic polymer.

56. The porous article of claim 53, wherein the at least one thermoplastic polymer further comprises a plurality of thermoplastic polymers.

57. The porous article of claim 53, having a specific resistance of less than about 2400 krayls and greater than about 0.24 krayls.

58. The porous article of claim 53, wherein said expanded fluoropolymer membrane is expanded polytetrafluoroethylene (ePTFE).

59. The porous article of claim 53. wherein the coherent irregular network comprises bridging.

60. The porous article of claim 53, wherein the coherent irregular network is greater than about 5 μm thick.

61. The porous article of claim 53, wherein the coherent irregular network is greater than about 5 μm thick and less than about 500 μm thick.

62. The porous article of claim 53, having a Sp value greater than about 35 μm on at least one surface.

63. The porous article of claim 53, wherein the particles of the at least one thermoplastic fluoropolymer consist essentially of fluorinated ethylene propylene (FEP).

64. The porous article of claim 63, wherein the FEP has a MFI of less than 1.0 g/10 min when tested at 372° C. and 2.16 kg load.

65. The porous article of claim 53, wherein the coherent irregular network has a BET surface area of at least about 0.35 m$^2$/g.

66. The porous article of claim 53, wherein the coherent irregular network has a BET surface area between about 0.25 m$^2$/g and about 5 m$^2$/g.

67. The porous article of claim 53, having a percent area shrinkage of less than about 20%.

68. The porous article of claim 53, having a percent area shrinkage of less than about 5%.

69. The porous article of claim 53 further comprising a hydrophilic coating and wherein the porous article is hydrophilic.

70. The porous article of claim 53, further comprising an oleophobic coating and wherein the porous article is oleophobic.

71. The porous article of claim 53, further comprising a support layer.

72. The porous article of claim 71, wherein the support layer is affixed to said coherent irregular network.

73. The porous article of claim 71, wherein the support layer is affixed to said porous expanded fluoropolymer membrane.

* * * * *

UNITED STATES PATENT AND TRADEMARK OFFICE
CERTIFICATE OF CORRECTION

| | | |
|---|---|---|
| PATENT NO. | : 8,808,848 B2 | Page 1 of 1 |
| APPLICATION NO. | : 12/879333 | |
| DATED | : August 19, 2014 | |
| INVENTOR(S) | : John Bacino | |

It is certified that error appears in the above-identified patent and that said Letters Patent is hereby corrected as shown below:

In the Specification

At column 6, line 22: remove "along"

At column 9, line 21: change "application it is intended" to --intended application--

At column 14, line 11: change "to materials" to --two materials--

At column 15, line 32: change "(ag)" to --(σg)--

At column 17, lines 29 and 31: change "slopping" to --sloping--

At column 21, line 40: remove "except"

In the Claims

At column 25, claim 33, line 8: remove "and"

At column 26, claim 55, line 20: remove "and"

At column 26, claim 59, line 31: change "claim 53." to --claim 53,--

Signed and Sealed this
Eleventh Day of November, 2014

Michelle K. Lee
*Deputy Director of the United States Patent and Trademark Office*